United States Patent
Abdelsalam et al.

(10) Patent No.: US 11,442,802 B2
(45) Date of Patent: *Sep. 13, 2022

(54) LINKING RELATED EVENTS FOR VARIOUS DEVICES AND SERVICES IN COMPUTER LOG FILES ON A CENTRALIZED SERVER

(71) Applicant: Palantir Technologies Inc., Palo Alto, CA (US)

(72) Inventors: Mahmoud Abdelsalam, Kirkland, WA (US); Eric Santos, Bothell, WA (US); Greg DeArment, Seattle, WA (US); Grant Wu, Seattle, WA (US); James Ross, San Francisco, CA (US); Kevin Simons, San Francisco, CA (US); Guodong Xu, Issaquah, WA (US); Peter Wang, Seattle, WA (US); Richard Niemi, Seattle, WA (US); Vivek Lakshmanan, Seattle, WA (US)

(73) Assignee: Palantir Technologies Inc., Palo Alto, CA (US)

( * ) Notice: Subject to any disclaimer, the term of this patent is extended or adjusted under 35 U.S.C. 154(b) by 10 days.

This patent is subject to a terminal disclaimer.

(21) Appl. No.: 16/878,928

(22) Filed: May 20, 2020

(65) Prior Publication Data

US 2020/0278900 A1 Sep. 3, 2020

Related U.S. Application Data

(63) Continuation of application No. 16/129,626, filed on Sep. 12, 2018, now Pat. No. 10,698,756.
(Continued)

(51) Int. Cl.
*G06F 11/07* (2006.01)
*G06F 11/34* (2006.01)
(Continued)

(52) U.S. Cl.
CPC ...... *G06F 11/0781* (2013.01); *G06F 11/0709* (2013.01); *G06F 11/0775* (2013.01);
(Continued)

(58) Field of Classification Search
CPC ............. G06F 11/0775; G06F 11/0781; G06F 11/0787; G06F 11/079; G06F 11/3072;
(Continued)

(56) References Cited

U.S. PATENT DOCUMENTS

| 5,463,768 | A | * | 10/1995 | Cuddihy | ............... | G06F 11/079 |
| | | | | | | 714/37 |
| 6,266,788 | B1 | * | 7/2001 | Othmer | ............... | G06F 11/3636 |
| | | | | | | 707/999.202 |

(Continued)

OTHER PUBLICATIONS

U.S. Pat. No. 10,698,756, Linking Related Events for Various Devices and Services in Computer Log Files on a Centralized Server, Jun. 30, 2020.

*Primary Examiner* — Gabriel Chu
(74) *Attorney, Agent, or Firm* — Knobbe Martens Olson & Bear LLP

(57) ABSTRACT

A system with an interactive user interface for users to view and interact with sanitized log data received from a plurality of hosts, such as those associated with various services of an organization. The system may receive from hosts log files and/or metadata that have been filtered by agents executing on the respective hosts to remove or anonymize any sensitive or confidential information prior to transmission to the system. In some embodiments the system does further filtering of the sanitized data. Received sanitized data is parsed, indexed, and/or otherwise processed for optimal searching, and stored in a log pipeline. The system causes display of an electronic visualization interface comprising a dynamic electronic search configured to receive an indication of various log search criteria, such as an error or trace (Continued)

identifier, that are used to identify matching log files meeting the provided criteria, such as log files associated with services executed on different hosts.

18 Claims, 11 Drawing Sheets

Related U.S. Application Data

(60) Provisional application No. 62/599,331, filed on Dec. 15, 2017.

(51) Int. Cl.
*G06F 21/62* (2013.01)
*G06F 16/901* (2019.01)
*G06F 11/30* (2006.01)

(52) U.S. Cl.
CPC ...... *G06F 11/0787* (2013.01); *G06F 11/3068* (2013.01); *G06F 11/3072* (2013.01); *G06F 11/3476* (2013.01); *G06F 16/901* (2019.01); *G06F 21/6245* (2013.01); *G06F 21/6254* (2013.01); *G06F 2201/835* (2013.01)

(58) Field of Classification Search
CPC ............... G06F 11/3476; G06F 11/366; G06F 11/3636; G06F 16/24578; G06F 16/26; G06F 16/285; G06F 16/287; G06F 16/901; G06F 16/335; G06F 17/40; G06F 21/6245; G06F 21/6254
See application file for complete search history.

(56) References Cited

U.S. PATENT DOCUMENTS

| | | | |
|---|---|---|---|
| 9,021,312 B1* | 4/2015 | Saxena | G06F 11/0778 714/38.1 |
| 9,811,686 B1* | 11/2017 | Marquardt | G06Q 30/04 |
| 9,996,545 B1* | 6/2018 | Goldberg | G06F 16/1748 |
| 10,698,756 B1 | 6/2020 | Abdelsalam et al. | |
| 2004/0078587 A1* | 4/2004 | Brackett | G06F 21/6254 713/193 |
| 2008/0256399 A1* | 10/2008 | Erdosi | G06F 11/366 714/47.1 |
| 2009/0006883 A1* | 1/2009 | Zhang | G06F 11/366 714/1 |
| 2011/0185234 A1* | 7/2011 | Cohen | G06F 11/3476 714/37 |
| 2012/0137182 A1* | 5/2012 | Zhang | G06F 11/0775 714/48 |
| 2012/0143893 A1* | 6/2012 | Abraham | G06F 11/3476 707/769 |
| 2014/0365828 A1* | 12/2014 | Jiang | G06F 11/0706 714/37 |
| 2015/0033221 A1* | 1/2015 | Chari | G06F 21/53 718/1 |
| 2015/0081918 A1* | 3/2015 | Nowack | H04L 43/065 709/227 |
| 2016/0034510 A1* | 2/2016 | Gukal | G06F 16/31 707/723 |
| 2017/0171231 A1* | 6/2017 | Reybok, Jr. | G06F 16/23 |
| 2017/0220405 A1* | 8/2017 | Larsen | G06F 11/0775 |
| 2018/0203890 A1* | 7/2018 | Chari | G06F 9/45558 |
| 2018/0322508 A1* | 11/2018 | Walthers | G06F 16/285 |
| 2018/0349218 A1* | 12/2018 | Berger | G06F 11/079 |
| 2019/0079818 A1* | 3/2019 | Handa | G06F 11/079 |

* cited by examiner

| Back | ◇ ▼ | level, "ERROR" ✕ | | | | 351 | | |
|---|---|---|---|---|---|---|---|---|
| Date Range | 2017-10-19 13:55:51 | 2017-10-19 14:05:51 | ↕ | Jump to timestamp | 2017-10-19 13:55:51.910 | Local ▼ | ? | Tail ☐ |
| Showing 7 columns  Only the newest 100 rows are shown. Show Older | | | | | | | | |
| | Time (Local) ▲ 356 | traceId ▲ 358 | level ▲ 360 | message ▲ 362 | params ▲ 364 | origin ▲ 366 | stacktrace ▲ 368 | |
| 84 | 2017-10-19 14:04:40.387 ◀ 354 | 49bd2d4bf6fecfc3 | ERROR | Error calculating Tag,continuing | Name "Lang-sql-asset-by" | location.name.build/ | server/location_of_service83— Caused by: File to open file /file/name83... | |
| | | | | 🔍 Modify filter with message: 'Error calculating Tag,continuing anyway' 🔍 Modify filter with NOT message 🔍 Search for other logs with message 'Error calculating Tag,continuing a... 🔍 Search for other logs with NOT message: 'Error calculating Tag, continui... 🗐 Copy Field | | | View full stactrace —at /location/server// location_of_service84—Caused by: Failed to open file /file/name84... | |
| | ↑ 370 | | | | | | | |
| 85 | 2017-10-19 14:04:40.483 | 1549ed710c7500079 | ERROR | Error calculating Tag,continuing anyway | Name "Lang-bundle-1.3.2" | location.name/build/ name2 | View full stactrace —at /location/server// location_of_service85—Caused by: Failed to open file | |

FIG. 3B

LINKING RELATED EVENTS FOR VARIOUS DEVICES AND SERVICES IN COMPUTER LOG FILES ON A CENTRALIZED SERVER

CROSS-REFERENCE TO RELATED APPLICATIONS

This application is a continuation of U.S. application Ser. No. 16/129,626, filed Sep. 12, 2018, which claims priority to U.S. Provisional Application No. 62/599,331, filed Dec. 15, 2017, all of which are hereby incorporated by reference in their entirety.

TECHNICAL FIELD

The present disclosure relates to systems and techniques for data integration, analysis, and visualization. More specifically, the systems and techniques relate to the creating and transmitting of a plurality of filtered error logs to a central server for further processing and analysis.

BACKGROUND

For many companies, its employees use large networks of host devices (for example, computers and cell phones) to access and use a range of software services. Devices may have different operating systems installed (for example, iOS, Android, Windows, or others) as well as different versions of the same software. Events and errors are typically documented on log files for further review so that a software development team can address the error based on complexity, urgency, and magnitude of the problem.

Currently errors are put in a list that is addressed one-by-one in order of time encountered or importance, or a combination of the two. However, the increasing complexity and volume of errors creates a need for faster resolution of the errors to keep up with demand. If a software development team cannot keep current with the errors it needs to resolve, only the priority errors will be addressed and many will be missed or unaddressed.

Also, such log files may include confidential or trade secret information from a customer that the customer may not want to be shared with other entities.

SUMMARY

In today's fast-paced work environment, software must be updated quickly and effectively to meet the needs of the workplace. Fast updates, more complicated software, increased number of software solutions, and an increased number of devices lead to an ever-increasing creation of events, requests, services, and errors created through daily use of the software by each device.

By creating conventions in the preparation of log files (and/or other data) between all software services used by a particular customer, on various host device, and uploading the log files to a central server (or log pipeline, or remote server), a software development team may use data analysis and automatic filtering to correlate and compare various log entries across multiple services from multiple host devices. The team can group similar errors (or other log entries) together to address the similar errors at the same time. This allows for the resolution of more errors in the same time, or marginally more time, than the resolution of just one of the errors would have been resolved otherwise. Thus, a robust logging infrastructure provides product teams, as well as implementation teams with clearer signal on issues and potential remediations. Quicker resolution of errors will improve a customer's perception of the software development team and give more time to the development team to create new features to include in the services.

Additionally, the log analysis systems discussed herein may protect sensitive (e.g., confidential) information included in log files from being transmitted to a remote server. For example, such confidential information may be removed from log files before transmitting to a central log pipeline, while still providing enough information to the software development team to analyze the log files (e.g., to address encountered errors). An electronic transportation relationship exists between multiple host devices and a central server such that various processed log files may be transferred from agents on the host devices to the central server to be stored in the log pipeline.

A dashboard user interface (UI) may be provided to show various compilations of log data across multiple hosts, such as totals of error logs across a customer's hosts. In some embodiments, hosts that interact in providing software services to a customer may number twenty, forty, sixty, eighty, or more. Additionally, the UI may provide drill down functionality, such as via a flame chart that displays associated log entries.

Accordingly, in various embodiments, large amounts of data are automatically and dynamically analyzed, indexed, filtered, etc., in response to user inputs (or automatically in some embodiments), and data requested by the user may be efficiently and compactly presented by the system. Thus, in some embodiments, the user interfaces described herein are more efficient as compared to previous user interfaces in which data is not dynamically updated and compactly and efficiently presented to the user in response to interactive inputs.

Further, as described herein, the system may be configured and/or designed to generate user interface data useable for rendering the various interactive user interfaces described. The user interface data may be used by the system, and/or another computer system, device, and/or software program (for example, a browser program), to render the interactive user interfaces. The interactive user interfaces, or electronic visualization interfaces, may be displayed on, for example, electronic displays (including, for example, touch-enabled displays).

Additionally, it has been noted that design of computer user interfaces "that are useable and easily learned by humans is a non-trivial problem for software developers." (Dillon, A. (2003) User Interface Design. MacMillan Encyclopedia of Cognitive Science, Vol. 4, London: MacMillan, 453-458.) The various embodiments of interactive and dynamic user interfaces of the present disclosure are the result of significant research, development, improvement, iteration, and testing. This non-trivial development has resulted in the user interfaces described herein which may provide significant cognitive and ergonomic efficiencies and advantages over previous systems. The interactive and dynamic user interfaces include improved human-computer interactions that may provide reduced mental workloads, improved decision-making, reduced work stress, and/or the like, for a user. For example, user interaction with the interactive user interfaces described herein may provide an optimized display of time-varying report-related information and may enable a user to more quickly access, navigate, assess, and digest such information than previous systems.

In some embodiments, data may be presented in graphical representations, such as visual representations, such as charts and graphs, where appropriate, to allow the user to comfortably review the large amount of data and to take advantage of humans' particularly strong pattern recognition abilities related to visual stimuli. In some embodiments, the system may present aggregate quantities, such as totals, counts, and averages. The system may also utilize the information to interpolate or extrapolate, for example forecast, future developments.

Further, the interactive and dynamic user interfaces described herein are enabled by innovations in efficient interactions between the user interfaces and underlying systems and components. For example, disclosed herein are improved methods of receiving user inputs, translation and delivery of those inputs to various system components, automatic and dynamic execution of complex processes in response to the input delivery, automatic interaction among various components and processes of the system, and automatic and dynamic updating of the user interfaces. The interactions and presentation of data via the interactive user interfaces described herein may accordingly provide cognitive and ergonomic efficiencies and advantages over previous systems.

Various embodiments of the present disclosure provide improvements to various technologies and technological fields. For example, as described above, existing data storage and processing technology (including, for example, in databases) is limited in various ways (for example, manual data review is slow, costly, and less detailed; data is too voluminous; etc.), and various embodiments of the disclosure provide significant improvements over such technology. Additionally, various embodiments of the present disclosure are inextricably tied to computer technology. In particular, various embodiments rely on detection of user inputs via graphical user interfaces, calculation of updates to displayed electronic data based on those user inputs, automatic processing of related electronic data, and presentation of the updates to displayed images via interactive graphical user interfaces. Such features and others (for example, processing and analysis of large amounts of electronic data) are intimately tied to, and enabled by, computer technology, and would not exist except for computer technology. For example, the interactions with displayed data described below in reference to various embodiments cannot reasonably be performed by humans alone, without the computer technology upon which they are implemented. Further, the implementation of the various embodiments of the present disclosure via computer technology enables many of the advantages described herein, including more efficient interaction with, and presentation of, various types of electronic data.

In some embodiments, a computing system for dynamically generating a dynamic electronic search system comprises: one or more computer readable storage devices configured to store a plurality of computer executable instructions; and one or more hardware computer processors in communication with the one or more computer readable storage devices and configured to execute the plurality of computer executable instructions in order to cause the computing system to: electronically receive, via one or more networks, sanitized data from a plurality of remote hosts, wherein the sanitized data comprises a plurality of log files each including unique identifiers of associated software services, wherein the remote hosts are configured to apply privacy rules to determine data that is uploaded to a log pipeline, wherein at least some unique identifiers of software services are included in multiple log files associated with related events performed by each of multiple software services; store, in a log pipeline comprising one or more databases, the plurality of log files; parsing the log files into log attributes, the log attributes including at least time stamps and unique identifiers of associated software services of the respective log files; indexing the log files, including the log attributes, into an indexed searching platform; and cause display of an interactive user interface, or electronic visualization interface, the interactive user interface comprising a dynamic electronic search configured to receive an indication of a unique identifier (either by the user entering or selecting a log entry from another UI) and identifying, based on the indexed searching platform, two or more matching log files having the same unique identifier from different hosts.

In some embodiments, the computing system may also comprise logs that are searched based on common error instance identification. In some embodiments, the system receives metadata from the remote hosts. In other embodiments, the system may further sanitize the data by removing any sensitive or confidential information that was not removed by the remote device. The system can also be configured to receive log files that have been filtered or scrubbed for confidential information such that the information received is still sufficient to process and search.

In some embodiments, the computing system may comprise improvements to searching such that a user can search based on one or more of: log freshness (as described below, for example), error identifiers, trace identifiers, service identifiers, originating service, originating host (the host the log line or log was created by), originating log (the log a particular log line, error, or other attribute is from), service version (or software version), error priority level (as designated by the host, user, system, or administrator, for example), magnitude of the error(as designated by the host, user, system, or administrator, for example), as well as other criteria. In some embodiments, the identifiers may be unique alphanumeric codes or phrases associated with the particular error, trace, service, for example.

In some embodiments, the computing system may provide improved interactive user interfaces that include various features, such as a customizable viewing pane that allows for adding/removing columns and viewable data.

In various embodiments, systems and/or computer systems are disclosed that comprise a computer readable storage medium having program instructions embodied therewith, and one or more processors configured to execute the program instructions to cause the one or more processors to perform operations comprising one or more aspects of the above- and/or below-described embodiments (including one or more aspects of the appended claims).

In various embodiments, computer-implemented methods are disclosed in which, by one or more processors executing program instructions, one or more aspects of the above- and/or below-described embodiments (including one or more aspects of the appended claims) are implemented and/or performed.

In various embodiments, computer program products comprising a computer readable storage medium are disclosed, wherein the computer readable storage medium has program instructions embodied therewith, the program instructions executable by one or more processors to cause the one or more processors to perform operations comprising one or more aspects of the above- and/or below-described embodiments (including one or more aspects of the appended claims).

BRIEF DESCRIPTION OF THE DRAWINGS

FIGS. 3A and 3B illustrate an example graphical user interface including search, sort, and display features related to service logs on a central server or Dynamic Data Search System.

DETAILED DESCRIPTION

Overview

By creating conventions in the preparation of log files (and/or other data) between all software services used by a particular customer, on various host device, and uploading the log files to a central server (or log pipeline, or remote server), a software development team may use data analysis and automatic filtering to correlate and compare various log entries across multiple services from multiple host devices. The team can group similar errors (or other log entries) together to address the similar errors at the same time. This allows for the resolution of more errors in the same time, or marginally more time, than the resolution of just one of the errors would have been resolved otherwise. Thus, a robust logging infrastructure provides product teams, as well as implementation teams with clearer signal on issues and potential remediations. A dashboard user interface (UI) may be provided to show various compilations of log data across multiple hosts, such as totals of errors logs across a customer's hosts. Additionally, the UI provides drill down functionality, such as via a flame chart that displays associated log entries.

In some embodiments discussed herein, a log pipeline is maintained by the central server is filled by log files transmitted from agents executing on hosts. The agents may communicate with the log pipeline over HTTPS, for example, by providing sanitized data logs, log metadata, log metrics, and the like. Thus, multiple host devices are in data communication with a central server such that various processed log files may be transferred from agents on the host devices to the central server to be stored in the log pipeline.

Figure 2:
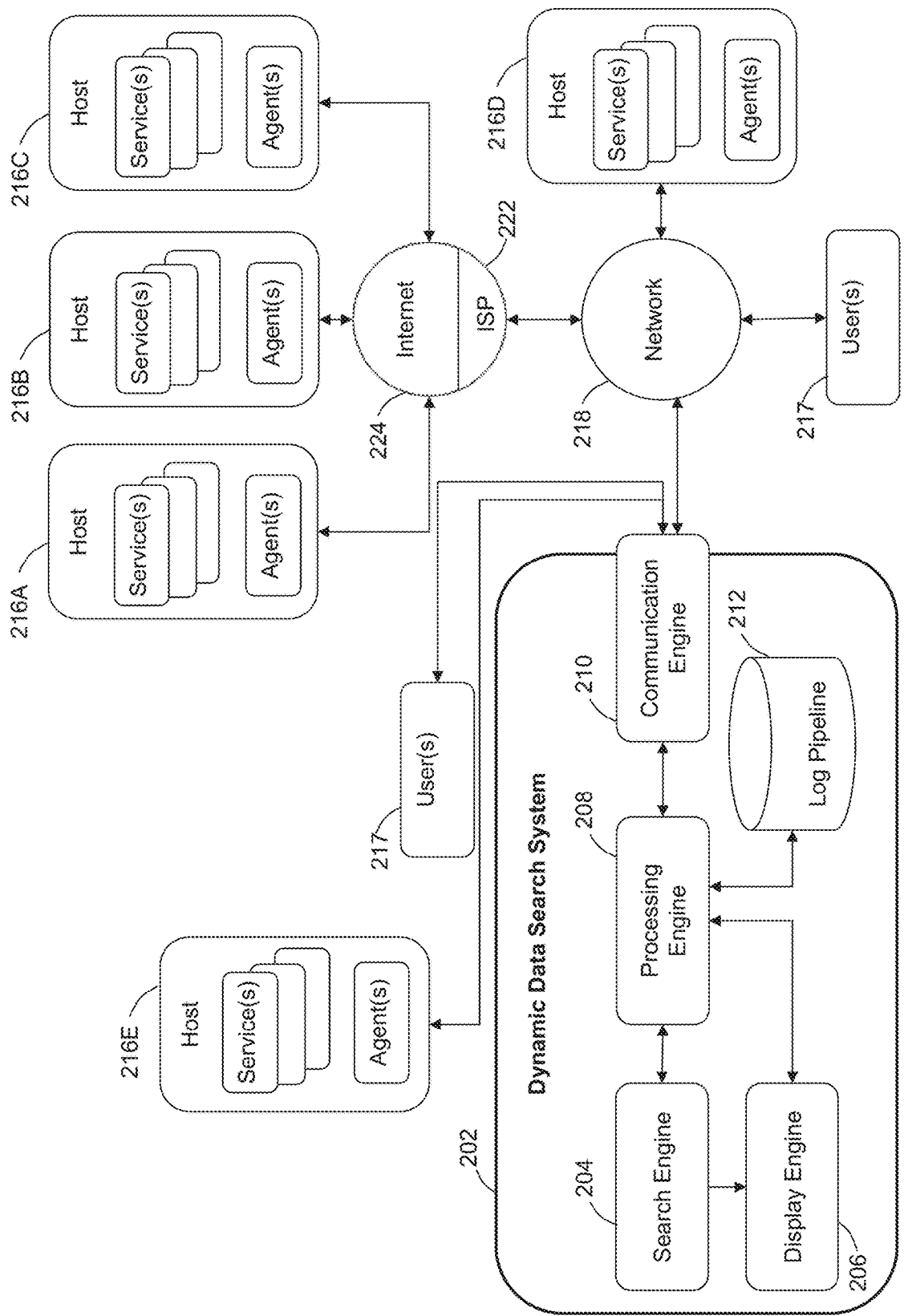
FIG. 2 illustrates an example block diagram of a computing system, including a dynamic data search system in communication with multiple hosts, each executing one or more software services.

In some embodiments, sanitized logs are logs that have been processed by the host system to remove confidential information (e.g., personally identifiable information), prepare the log in the proper format, or anything else desired by the central server (the dynamic data search system 202 in FIG. 2). For example, the central server may indicate logging specifications (for example, no personal data may be sent to the log pipeline) to be applied by all hosts and/or individual hosts may have additional/different data sharing requirements. Thus, each host may apply a whitelist (or blacklist and/or other data logging rules) to filter logs prior to sending them, providing a control point for disabling log propagation. For example, developers may whitelist particular hosts or services for provision of log data to the log pipeline. In some embodiments, any user-entered information may be assumed to be sensitive and remain within the originating host. By differentiating between safe and sensitive data, the log analysis system protects against sensitive data leaving the originating host. Static code analysis can be used to ensure compliance with any safe logging standards. For example, static code analysis may include the running of specific tools that attempt to highlight possible vulnerabilities within 'static' (non-running) source code by using various techniques (for example, taint analysis or data flow analysis).

Log entries (e.g., log lines or any other data stored by a software service) may be associated with metadata (e.g., wrapped with an envelope) including information such as the hostname, IP address, and/or additional metadata about the origin of the log line. Metadata to be included in log entries may be indicated in a logging specification stored by the central server, thus providing a uniform data format for use by agents in preparing log entries for access by the central server.

Additionally, log payloads may be encrypted by SSL (or other security protocol) in transport to the central server and/or within the log pipeline. Additionally, metrics data is indexed in a fully-managed telemetry service, or automatic recording and transmission of data from remote or inaccessible sources to an information technologies system in a different location, for monitoring and analysis. For example, a user may search for related log entries across multiple hosts, via an elastic search of a dynamic index of the log pipeline, such as to identify log entries in multiple separate log files (from separate hosts, which normally wouldn't be easily searchable) including a particular error identifier (for example, a trace ID and/or instance ID).

Terms

In order to facilitate an understanding of the systems and methods discussed herein, a number of terms are defined below. The terms defined below, as well as other terms used herein, should be construed to include the provided definitions, the ordinary and customary meaning of the terms, and/or any other implied meaning for the respective terms. Thus, the definitions below do not limit the meaning of these terms, but only provide exemplary definitions.

Agent(s): A software and/or hardware components that processes event data generated by a host based on pre-configured logging specifications (for example, no personal data may be included in the resulting sanitized even data) to be applied. For example, an agent may impose a whitelist (or blacklist and/or other data logging rules) to filter or sanitize event data. Once the event data is sanitized as described further herein, sanitized event data and metadata (or metrics) are transmitted to a Central Server by the agents. Such metadata or metrics may include the hostname, IP address, and/or additional metadata about the origin of each log line—all of which may be listed in a logging specification.

Event Data: Any data associated with operation of a software service, which may also be associated with metadata (e.g., wrapped with an envelope) including information such as the hostname, IP address, and/or additional metadata about the origin of the log line. Event data may include log data, log entries, user input, timestamps, software status logs, error logs, and/or any other data associated with a software service.

Central Server (Dynamic Data Search System): Maintains a log pipeline to receive sanitized logs from agents operating on (or otherwise in communication with) host devices. For example, the central server may impose logging specifications (for example, no personal data may be sent to the log pipeline) to be applied to all hosts and/or individual hosts may have additional/different data sharing requirements.

Log Pipeline: An aggregation of log entries and/or other event data, maintained by the central server, from each of multiple hosts. Various processed log files may be transferred from agents on the host devices to the central server for storage in the log pipeline.

Sanitized Logs: Logs that have been processed by the originating system or host to remove confidential information, prepare the log in the proper format, or anything else desired by the central server.

Service(s): Applications or other software running on a Host.

Data Store: Any computer readable storage medium and/or device (or collection of data storage mediums and/or devices). Examples of data stores include, but are not limited to, optical disks (for example, CD-ROM, DVD-ROM, etc.), magnetic disks (for example, hard disks, floppy disks, or other similar devices), memory circuits (for example, solid state drives, random-access memory (RAM), or other similar devices), and/or the like. Another example of a data store is a hosted storage environment that includes a collection of physical data storage devices that may be remotely accessible and may be rapidly provisioned as needed (commonly referred to as "cloud" storage).

Database: Any data structure (and/or combinations of multiple data structures) for storing and/or organizing data, including, but not limited to, relational databases (for example, Oracle databases, MySQL databases, or other similar databases), non-relational databases (for example, NoSQL databases, or other similar databases), in-memory databases, spreadsheets, as comma separated values (CSV) files, eXtendible markup language (XML) files, TeXT (TXT) files, flat files, spreadsheet files, and/or any other widely used or proprietary format for data storage. Databases are typically stored in one or more data stores. Accordingly, each database referred to herein (for example, in the description herein and/or the figures of the present application) is to be understood as being stored in one or more data stores.

Property Type: The type of data a property is, such as a string, an integer, or a double. Property types may include complex property types, such as a series data values associated with timed ticks (for example a time series), etc.

Property Value: The value associated with a property, which is of the type indicated in the property type associated with the property. A property may have multiple values.

Dynamic Data Search System or Central Server

In some embodiments, agents executing on hosts process and filter log files associated with one or more services running on the host device. The agents may also transmit the filtered, or sanitized, log files to a Dynamic Data Search System.

Figure 1:
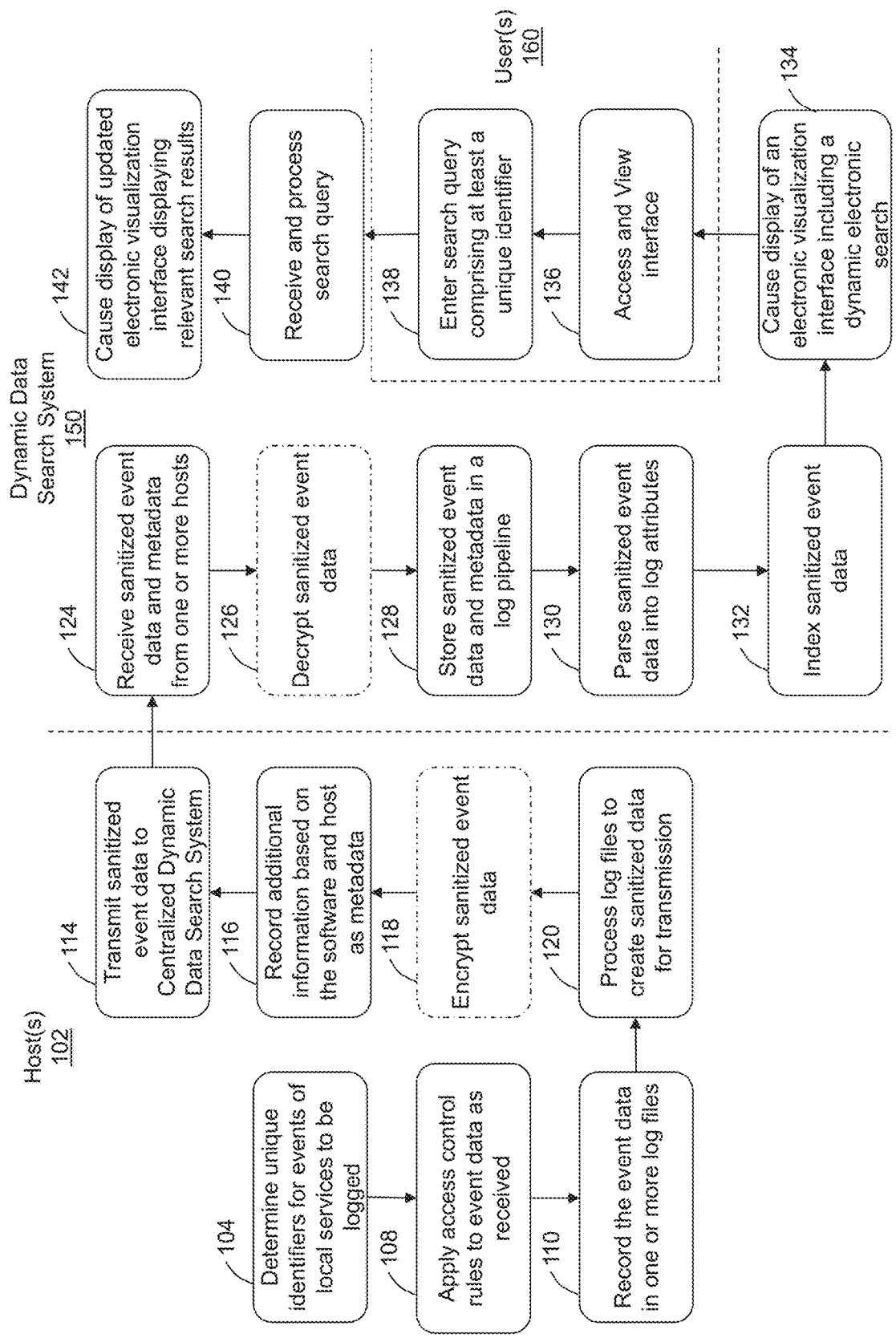
FIG. 1 illustrates a flowchart illustrating an example method of creation, transmission, processing, and review of log files from hosts, according to various embodiments of the present disclosure.

FIGS. 1 and 2 illustrate a method diagram and a system diagram of one embodiment of the Dynamic Data Search System described herein. It should be appreciated that many variations and modifications may be made to the embodiments described in this figure, the elements of which are to be understood as being among other acceptable examples. All such modifications and variations are intended to be included herein within the scope of this disclosure. Also, all steps and blocks should be interpreted to be acceptable in no particular order, except where the system or method would not function for its intended purpose. One or more of the blocks described may be optional in certain implementations.

FIG. 1 illustrates a flowchart illustrating an example method of creation, transmission, processing, and review of log files from hosts, according to various embodiments of the present disclosure. FIG. 1 includes actions taken by one or more Hosts 102, the Dynamic Data Search System 150, and one or more Users 160. The Dynamic Data Search System 150 and the Users 160 may communicate over a local area network, the internet, or any other suitable means. The Dynamic Data Search System 150 may also be a local network database or a local database in some implementations. The Users 160 and the Hosts 102 may not necessarily communicate. However, in some embodiments, the Users 160 may communicate over a local area network, the internet, or any other suitable means to the Hosts 102 either completely or in a limited way. In some embodiments, the Hosts 102 are operated by other users, distinct from the Users 160. In some embodiments, the Dynamic Data Search System 150 has the same or similar to components to the Database System 902 described in FIG. 9, and/or the Computer system 800 described in FIG. 8.

In block 104, the one or more Hosts 102 determine unique identifiers for events of local services to be logged. In some embodiments, there may be a plurality of services running on a Host 102. Each service is run locally on the Host 102 and logs are generated for various events and errors. Unique identifiers are created and assigned to various events across all services. In some embodiments, determination of unique identifiers are pre-programmed on all, or a subset of, Hosts 102 so that similar (or the same) events and errors across Hosts 102, or services run on the Hosts 102, are associated with the same unique identifier. Associating similar events or errors with the same unique identifier is advantageous because it allows the Users 160 to quickly sort and reference events or errors across all Hosts 102 and all services on the Host 102 as described herein.

In block 108, Host 102 applies access control rules to event data as the event data is being recorded or prior to any event data being recorded. In some embodiments, the Hosts 102 filter event data that includes sensitive or confidential information as the event data is created. Event data may include events taking place in the execution of features in various services (for example, inputs, outputs, errors encountered, or others), transactions (for example, changes to any stored data, or other transactions between services, Hosts 102, or other devices), messages (for example, communications between multiple Hosts 102, services, or a Host 102 and the Dynamic Data Search System 150), and any other information that may be useful to the Dynamic Data Search System 150 or the Users 160, or any other system or person. For example, the Dynamic Data Search System 150 may impose logging specifications (for example, no personal data may be sent to the log pipeline) to be applied to all Hosts 102, or individual hosts may have additional/different data sharing requirements. In some embodiments, each Host 102 may apply a whitelist (or blacklist and/or other data logging rules) to filter logs prior to transmitting them, providing a control point for disabling log propagation. For example, developers may whitelist particular hosts or services for provision of log data to the log pipeline. Any user-entered information may be assumed to be sensitive and remains within the originating host. By differentiating between safe and sensitive parameters, the software development process protects against sensitive data leaving the originating host. In some embodiments, static code analysis can be used to ensure compliance with any safe logging standards.

In block 110, after filtering out any secure or confidential information, the Host 102 records the remaining event data in one or more log files to be transmitted to the log pipeline. It should be appreciated that in some embodiments block 108 may occur prior to block 110, such that log files may be entirely stored at the host 102 (e.g., with confidential information) and any filtering of the log files for maintaining confidentiality may be applied as the log files are transmitted to the log pipeline (such as in block 120, below).

In block 120, the Host 102 processes the created log files to create the sanitized data for transmission. The Host 102 may further sanitize the event data or log files by further removing confidential or potentially confidential information. In some embodiments, it may be advantageous to include more information during the creation of a log file (for example, confidential information or information specific to the Host 102) for the Host 102 administrators to review or for combining with other log files prior to block 114, as described below. Thus, in block 120, the Host 102 completes the sanitizing of the log files to remove confidential information.

In block 118, the Host 102 may optionally (as designated by the dashed lined) encrypt the sanitized data, or sanitized log files using any conventional or developed encryption tool. In some embodiments, the encryption tool may be implemented in collaboration with the Dynamic Data Search System 150 so that the Dynamic Data Search System 150 can decrypt the information with complete certainty and relatively error-free. In some embodiments, log payloads may be encrypted in transport to the Dynamic Data Search System 150 and within the log pipeline.

In block 116, the Host 102 records additional information as metadata based on the software and Host 102 information (for example, IP address, Host 102 device name, person associated with the Host 102, software version of the services installed, software version of the services included in the one or more logs, or anything else particular to the Host 102 that was not previously recorded in the logs). In some embodiments, metadata is limited to information that is not confidential so that it may be transmitted to the log pipeline. In some embodiments, event data may be wrapped with an envelope including information such as the hostname, IP address, and/or additional metadata about the origin of the log line—all of which may be listed in the logging specification. Additionally, in some embodiments, metrics data is indexed in a fully-managed telemetry service for visualization and analysis. For example, a User 160 may search for related log entries across multiple Hosts 102, via an elastic search of a dynamic index of the log pipeline, such as to identify log entries in multiple separate log files (from separate hosts, which normally wouldn't be easily searchable) including a particular error identifier (for example, a trace ID and/or instance ID).

In block 114, the agent associated with the Host 102 transmits the sanitized event data to a log pipeline of the Dynamic Data Search System 150. The sanitized event data may be transmitted by any suitable means. In some embodiments, the transmission may occur over a local area network, the internet, or any other suitable means. Although speed of the transfer is important in some embodiments such that direct communication over a local area network or the internet is preferred, there may be some embodiments where security is more important, and the transfer can be physically performed (for example, via a USB flash drive or hard drive, or other physical storage medium). Thus, in some embodiments the Dynamic Data Search System 150 maintains a log pipeline that is filled by the Hosts 102 through agents (see FIG. 2 for more information on agents) located on each of the hosts.

In block 124, the Dynamic Data Search System 150 receives the sanitized event data and metadata from one or more Hosts 102. Several example methods are described in relation to block 114.

In block 126, the Dynamic Data Search System 150 decrypts any sanitized event data that it receives in an encrypted format, as described in more detail in block 118. In some embodiments, the Dynamic Data Search System 150 may receive some encrypted data and some data that is not encrypted. In that case, the Dynamic Data Search System 150 may decrypt the encrypted data and do no further processing to the other non-encrypted data in block 126. In some embodiments, no encrypted data may be transmitted in block 114 to the Dynamic Data Search System 150. In that case, block 126 would be optional and skipped.

In block 128, the Dynamic Data Search System 150 stores the sanitized event data (e.g., log entries and associated metadata) in a log pipeline.

In block 130, the Dynamic Data Search System 150 parses the sanitized event data into log attributes. The log attributes may be filtered, sorted, or referenced by Users 160 accessing the Dynamic Data Search System 150. In some embodiments, log attributes may include fields such as an identifier (for example, a trace ID and/or instance ID), a time stamp associated with the time of the entry, a description of the event or error, or any other field that may be useful. Log attributes may include log freshness, error identifiers, trace identifiers, service identifiers, originating service, originating host, originating log, service version, error priority level, magnitude of the error, and the like.

In block 132, the Dynamic Data Search System 150 indexes the sanitized log data based on the log attributes and incorporates the log data into the Dynamic Data Search System 150, such as part of the log pipeline and/or another data structure, for accessing.

In block 134, the Dynamic Data Search System 150 causes display of an interactive user interface including a dynamic electronic search. In some embodiments, and as described with respect to FIGS. 3 to 7, the interface provides Users 160 access to view and manipulate the indexed sanitized event data.

In block 136, the Users 160 access and view the interactive user interface. In some embodiments, the event data cannot be modified, but only viewed in lists, graphs, charts, or any other analytical tool.

In block 138, Users 160 may enter a search query comprising at least a unique identifier to dynamically search through some or all of the sanitized event data received from the Hosts 102 (in the log pipeline). In some embodiments, Users 160 may search with multiple fields, for example, any of the log attributes listed above or any indexed field associated with the sanitized data. Additionally, in some embodiments, the metrics data received by the Dynamic Data Search System 150 may allow a User 160 to search for related log entries across multiple Hosts 102, via an elastic search of a dynamic index of the log pipeline, such as to identify log entries in multiple separate log files (from separate hosts, which normally wouldn't be easily searchable) including a particular error identifier (for example, a trace ID and/or instance ID) or log entries (e.g., from different hosts) that are each associated with operations that were initiated from a particular process.

In block 140, the Dynamic Data Search System 150 receives and processes the User's 160 search query.

In block 142, the Dynamic Data Search System 150 causes display of the updated interactive user interface displaying relevant search results. In some embodiments, searching a unique identifier will result in the Dynamic Data Search System 150 causing display via the interactive user interface of one or more matching events. In some embodiments, it is possible no events exist in the database and the Dynamic Data Search System 150 may return search results in Block 142 indicating there were no hits. In other embodiments, the Dynamic Data Search System 150 may return suggested results if there were no hits, or if it is likely there was a typographical error (for example, this may be indicated by having similar searches run concurrently by the Dynamic Data Search System 150 having far greater number of hits than the search run by the User 160).

FIG. 2 illustrates an example block diagram of a computing system, including a dynamic data search system 150 (or simply "system 150") in communication with multiple hosts, each executing one or more software services. The components described herein with reference to the system 150 are not meant to be exhaustive but only a sample of what components may be implemented in a Dynamic Data Search System 150. Some components may be combined and others may be removed or substituted with similar components.

The example Dynamic Data Search System 150, as described in FIG. 2, includes a Communication Engine 210, Processing Engine 208, Log Pipeline 212, Display Engine 206, and a Search Engine 204.

In the embodiment of FIG. 2, the Communication Engine 210 is the interface the system 150 uses to communicate with other devices, such as via Network 218, the Internet, and/or any combination of communication networks. In some embodiments, the Communication Engine 210 may comprise multiple components, such as one or more receivers, one or more transmitters, or any other device used for communication. The Communication Engine 210 also connects with the internal components of the system 150 through the Processing Engine 208. In some embodiments, the Communication Engine 210 may directly communicate with any of the internal components.

In the embodiment of FIG. 2, the Processing Engine 208 is in communication with the Communication Engine 210 and processes data received from various external source (e.g., the hosts 216) to the log pipeline. For example, the Processing Engine 208 may perform parsing, indexing, formatting, and/or sorting of received event data prior to storing in the Log Pipeline 212, so that searching of events in the log pipeline is optimized. In some embodiments, processing of the data received from Hosts 216A-D may be searchable by the Search Engine 204 at during or before processing by the Processing Engine 208 and/or before the data is stored in the Log Pipeline 212.

In the embodiment of FIG. 2, the Log Pipeline 212 comprises a database (or other data structure) maintained by the Dynamic Data Search System 150. Agents on each Host 216A-D communicate over HTTPS, for example, by providing sanitized data logs, log metadata, log metrics, and the like to the system 202 for indexing and storage in the Log Pipeline 212. In some embodiments, the Dynamic Data Search System 150 may indicate logging specifications (for example, no personal data may be sent to the log pipeline) to be applied by all hosts and/or individual hosts may have additional/different data sharing requirements. Thus, each host may apply a whitelist (or blacklist and/or other data logging rules) to filter logs prior to sending to the Dynamic Data Search System 150, providing a control point for disabling log propagation. For example, developers may whitelist particular hosts or services for provision of log data to the log pipeline. In some embodiments, any user-entered information may be assumed to be sensitive and remains within the originating host. By differentiating between safe and sensitive data, Agents that operate on different hosts protect against sensitive data leaving the originating host. Static code analysis can be used to ensure compliance with any safe logging standards. In some embodiments, event data, or log lines, may be wrapped with an envelope including information such as the hostname, IP address, and/or additional metadata about the origin of the log line—all of which may be listed in the logging specification. Finally, log payloads may be encrypted by SSL in transport to the central server and within the log pipeline. Additionally, metrics data may be indexed in a fully-managed telemetry service for visualization and analysis.

In the embodiment of FIG. 2, the Display Engine 206 accesses processed data from the Processing Engine 208 and/or data from the Search Engine 204 to render and generate a dynamic interactive user interface to be manipulated by one or more Users 217. In some embodiments, the Display Engine 206 provides access to view, edit, search, and/or analyze data in the Log Pipeline 212, such as based on user-specific access rights. In other embodiments, some or all user may not be able to access, view, edit, search, or analyze the data, but only may be able to do a subset of such actions.

In the embodiment of FIG. 2, the Search Engine 204 indexes, sorts, and/or otherwise organizes the data in the Log Pipeline to optimize searching of the information. Various searching techniques and algorithms may be implemented by the Search Engine 204 (for example, machine learning, neural networks, various textual searching methods, or anything else applicable). In some embodiments, searching may be performed on-demand by Users 217, such as at the time the user provides search criteria. For example, search terms entered in a search bar with optional filtering by a user may be run at any time by the user, with results presented upon each search. Also, in some embodiments, searching may be performed automatically (continuously or periodically) by the Search Engine 204. For example, the system may apply preconfigured filters or criteria to the log pipeline as log entries are received from various hosts. Alert/notification rules may be applied to results of such a continuous search so that one or more Users 217 are notified if certain criteria are met (e.g., set by the particular user and/or organization) by newly received incoming data (and/or newly received incoming data in combination with historical data). In some embodiments, searching may initially be performed in response to a user query, and the query may subsequently be stored as criteria for continuous (or periodic) application to the log pipeline.

In some embodiments, the Search Engine 204 allows searching by log entry ID (e.g., error ID), instance ID, name of event, host name, host IP, service(s), versions of service(s), or any other data field associated with the data in the log files. For example, a user may search for related log entries across multiple hosts, via an elastic search of a dynamic index of the log pipeline, such as to identify log entries in multiple separate log files (from separate hosts, which normally wouldn't be easily searchable) including a particular error identifier (for example, a trace ID and/or instance ID). In some embodiments, the Search Engine 204 may include an autocomplete functionality allowing a User to begin typing via the interactive user interface and have possible results appear for the user to click on. Advantages would include assisting the user in spelling the remaining characters of a word (or phrase or sentence), providing the results of search terms instantaneously as the user types in a query (perhaps for more commonly used search terms where results may be cached for immediate access), and/or saving user time in entering the text, for example.

In the embodiment of FIG. 2, the Network 218, facilities communication channels between one or more Dynamic Data Search Systems, one or more Users 217 (which may be the same as User(s) 160 in FIG. 1), and/or one or more Hosts 214 (which may be the same as Hosts 102 in FIG. 1). In this example, the Network 218 is connected to the Internet 224 through an Internet Service Provider (ISP) 222. In some embodiments, the Dynamic Data Search System 150 is connected directly to the Internet 224 through the ISP 222 and does not connect to a Network 218. This can be advantageous to allow faster communications, such as between Hosts 216 and the system 202. In some embodiments, the Dynamic Data Search System 150 communicates with a secure local network (e.g., part of the network 218) to reduce risk of unauthorized access to data within the system 150 (e.g., in log pipeline 212) by unauthorized Hosts 214 or third parties.

In the embodiment of FIG. 2, User(s) 217 may communicate and interact with the Dynamic Data Search System 150 through the Network 218, the Internet 224 (through an ISP 222—not shown in FIG. 2), a direct connection to the Dynamic Data Search System 150, and/or other network communication link. In some embodiments, Users 217 do not have access to data on the Hosts 216A-D, such as to secure information (e.g., raw event data) that may be transmitted from hosts 216 to the system 202. In some embodiments, one or more User 217 may have complete or limited access (for example, access to a subset of Hosts 216A-D or access to one or more Hosts 216A-D for a specific period of time) to the Hosts 216A-D in order to view any particular data useful to a User 217.

In the embodiment of FIG. 2, Hosts 216A, 216B, 216C, 216D, and 216E, through their respective Agent(s), may communicate with the Dynamic Data Search System 150 through the Network 218 (for example, Host 216D), the Internet 224 through an ISP 222 (for example, Hosts 216A, 216B, and 216C), or a direct connection to the Dynamic Data Search System 150 (for example, Host 216E). The Agents process event data generated by host service(s) based on pre-configured logging specifications (for example, no personal data may be included in the resulting sanitized even data) to be applied. For example, an agent may impose a whitelist (or blacklist and/or other data logging rules) to filter or sanitize event data. Once the event data is sanitized as described further herein, the sanitized event data and metadata (or metrics) are transmitted to the system 202 by the agent. Such metadata or metrics may include the hostname, IP address, and/or additional metadata about the origin of each log line—all of which may be listed in a logging specification. The Service(s) on the hosts may be applications or other software. In some embodiments, the Hosts 216A-E have the same or similar components to the User Computing Device 904 described in FIG. 9, and/or the Hosts 824 described in FIG. 8.

In some embodiments, an alert and/or notification may be automatically transmitted to the Host 216A-E operated by an entity associated with the hosts (e.g., alerts may be transmitted to an entity that has tens, hundreds, thousands, or more services operating on the hosts). In some embodiments, alerts may be based on rules or preconfigured criteria, so that once the rule is satisfied, an alert is sent to one or more users. For example, alerts may include, notifications upon the creating of event data, the creating of sanitized event data, the transmission of the sanitized event data to a Dynamic Data Search System, multiple logs being associated with a particular error identifier (for example, a trace ID and/or instance ID), or anything else relevant to the entity associated with the Host. The alert and/or notification can be transmitted at the time that the alert and/or notification is generated or at some determined time after generation of the alert and/or notification.

When received by the device, the alert and/or notification can cause the device to display the alert and/or notification via the activation of an application on the device (for example, a browser, a mobile application, etc.). For example, receipt of the alert and/or notification may automatically activate an application on the device, such as a messaging application (for example, SMS or MMS messaging application), a standalone application (for example, a data analysis application), or a browser, for example, and display information included in the alert and/or notification. If the device is offline when the alert and/or notification is transmitted, the application may be automatically activated when the device is online such that the alert and/or notification is displayed. As another example, receipt of the alert and/or notification may cause a browser to open and be redirected to a login page so that the entity can log and view the alert and/or notification. Alternatively, the alert and/or notification may include a URL of a webpage (or other online information) associated with the alert and/or notification, such that when the device (for example, a mobile device) receives the alert, a browser (or other application) is automatically activated and the URL included in the alert and/or notification is accessed via the Internet.

In some instances, the Agents on the Hosts may allow access to the Dynamic Data Search System through Application Programming Interfaces (APIs). Typically, each API requires its own set of information about a data object, such as name, age, and height for a data object representing a person. Advantageously, embodiments of the present disclosure may collect information related to a service on a particular Host, form API requests in the format and containing the information required by the API of each Host, collect responses from the API of each Host, translate the different results back into a uniform format that facilitates comparison, storage and/or processing, and show the results to the User. In some embodiments, different Hosts may require different types of information, and in different format; for example, Host A may require a service name and version number, whereas Host B may require a service name but not a version number.

Graphical User Interface Examples

FIGS. 3 through 7 illustrate example graphical user interfaces illustrating certain features of a Dynamic Data Search System.

Figure 3A:
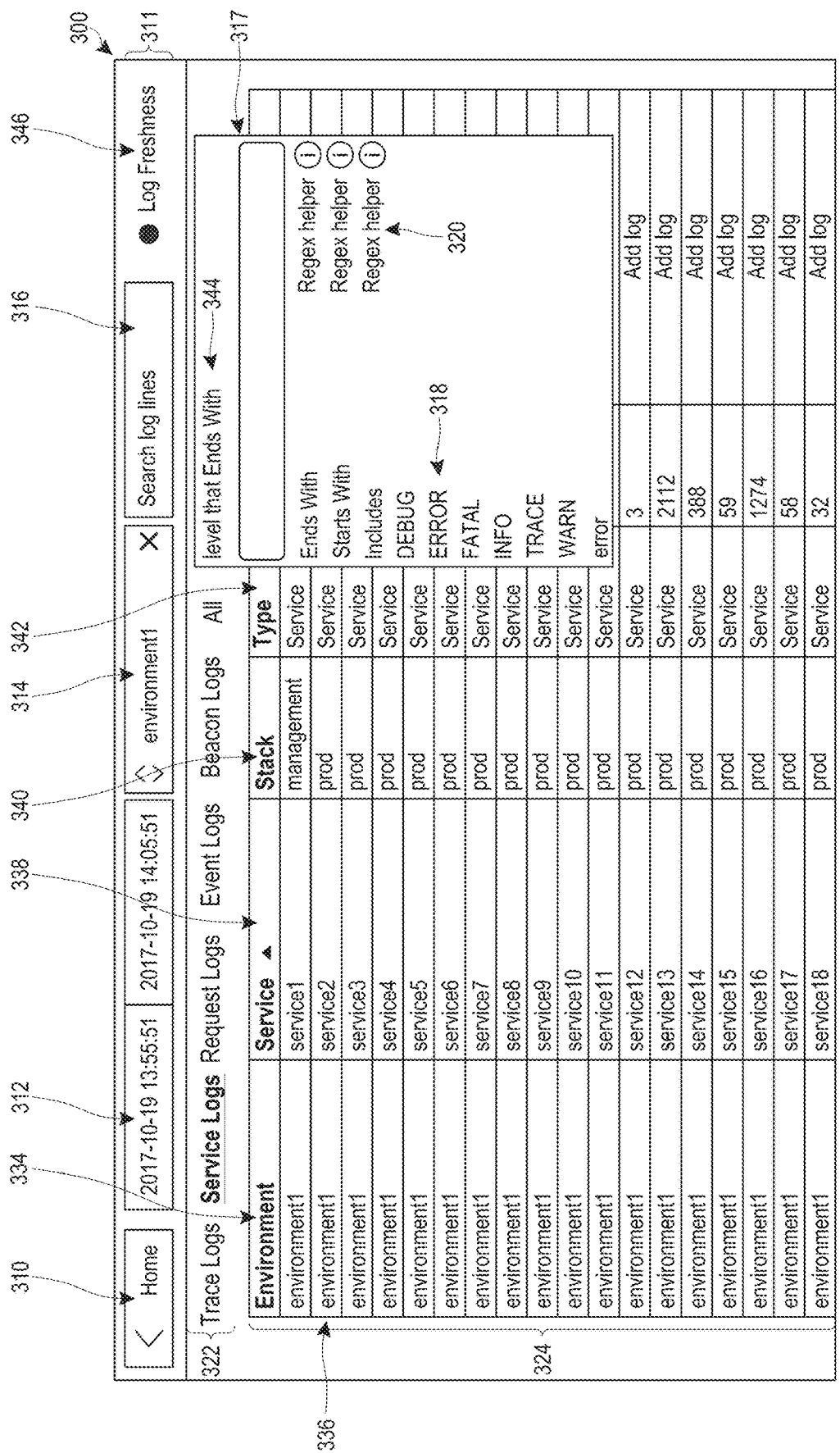

For example, FIGS. 3A and 3B illustrate example graphical user interfaces including search, sort, and display features related to service logs stored in a log pipeline of the Dynamic Data Search System. In FIG. 3A, the graphical user interface enables a user (for example, a developer) to view all logs of services, or a subset of logs, in the log pipeline described above. The user discussed in this section may be the same as, or similar to, the users discussed in FIGS. 1 and 2. The logs of services may be the same as the sanitized event data, either with or without associated metadata, as discussed in FIGS. 1 and 2.

In some embodiments, the graphical user interface 300 may include a searching pane 311. The searching pane 311 may include a return button 310 that, when selected, causes the graphical user interface to display a screen viewed prior to the current graphical user interface displayed in FIG. 3A. In some embodiments, the return button 310 may, when selected, causes the graphical user interface to display a home page, which may provide access to other searching and analysis functions, among other functions.

The searching pane 311 may also include options to filter a search. For example, a time filter 312, an environment filter 314, and a searching bar 316.

The time filter 312, may include a calendar to select dates, a clock to select times, shortcuts for the date or time (for example, text may be displayed that reads "Past 10 Minutes" or "Past 5 Days"), or any other interface for a user to provide time filtering criteria. By entering a time range, a user can choose what timeframe of data appears in the search results of the log pipeline.

The environment filter 314 allows a user to filter by a particular environment. For example, an environment may be one or more systems that collaborate to provide a place to host software, applications, or services. The environment being searched in FIG. 3A is "environment1," which may represent an internal nickname for a set of software services. The environment filter 314, in some embodiments, can be presented as a text box to type in the environment name, a drop-down list, or anything else that allows a user to enter the environment name. It can be advantageous to search particular environments without separately communicating to an administrator of the environment.

The search bar 316 allows a user the ability to search the log files with either textual word searching or preprogrammed criteria. In some embodiments, a search options box 317 may appear when a user selects or begins typing in the search bar 316. The search options box 317 assists a user in selecting search options or terms. For example, FIG. 3A displays a search options box 317 that includes several searching options 318, such as "Ends With" (for example, allowing a user to search a particular alphanumeric string that the event may end with) or ERROR (for example, allowing a user to search by error type or name). As a user selects or hovers over a searching option 318, an example search 344 may appear to assist the user in creating a functioning or useful search. It can be advantageous to display an initial search string so that a user can save time by creating a fully functioning search in the format the system can accept. The example search 344 may also be created using autocomplete functionality as described in more detail above. In some embodiments, a helper button 320 may be selected to provide information in the user interface on how to craft a proper or effective search using the associated search term/function. For example, the "Ends With" search option might have a particular searching function format, or the search option may not be described sufficiently by the title such that a user understands the purpose of the search option. In cases such as these, the user may select the helper button 320 for more information.

A log freshness indicator 346 may also be displayed in one or more of the user interfaces. In one embodiment, the log freshness indicator 346 may be used to indicate to a user a comparison between the time of the currently reviewed logs in a log queue (e.g., a list of error log entries flagged for review, such as by application of rules that automatically select and possibly rate log entries for user review) and the time of the most recent entry into the log queue. The indicator may be programmed to indicate to a user whether the user is ahead of or behind schedule in reviewing and addressing logs as they are entered into the system in a queue.

In some embodiments, a user may also have the option to select various log lines and choose to view event attributes for the selected log line(s), an option to unselect all selected log lines, and an option to view logs for all log lines in the search results list 324. For example, the search results may only display relevant log lines (e.g., those matching any providing filter criteria) from various log files received from Hosts. It would be advantageous to select multiple log files related to various log lines to view or search together.

A Viewing Pane 322 may be displayed on the graphical user interface so that a user can modify what the user is viewing. Some viewing options may include event logs, trace logs, service logs, request logs, beacon logs, or an option to view all logs.

In some embodiments, event logs may provide users, or system administrators, with information useful for diagnostics and auditing. In some embodiments, the Agent of each host (as described above) may incorporate preconfigured formats for what classes of events will be logged, what details may appear in the event log lines, or any associated codes or IDs for each class of event. For example, some information that may be logged may include errors (for example, errors that indicate a failure within a system that call loss or failure of important functionality), warnings (for example, errors that may not be critical but that could become critical if not addressed), information (for example successful progress and the state of the system), and/or auditing (for example, logon failures and other permission-related issues or logon successes).

In some embodiments, trace logs may be more specific or detailed than event logs. In some embodiments, similar to event logs, the Agent of each host (as described above) may incorporate preconfigured formats for what will be logged and how it is logged (for example, with unique IDs). For example, some information that may be logged may include trace errors (for example, user errors, operation errors, or application errors that might prevent the system from functioning correctly but would not impact other users), trace warnings (for example, potential threats that may not be errors but that could become an error if not addressed), trace information (for example successful progress or significant events related to the system), and/or trace detail (for example, additional details of information that can be displayed).

In some embodiments, service logs may be event logs (as described above) for particular services or applications running on a host. In some embodiments, request logs may be a record of requests the system has processed. In some embodiments, beacon logs may be logs created by particular components in a system. For example, a hard drive temperature sensor may log 10,000 values over a period of time. In FIG. 3A, service logs are shown.

FIG. 3A also shows a search results list 324 that includes at least some of the results of the filtered search in the example. A user, in this example, searched for the environment 334 "environment1" over a period of time as entered in 312. The data included may be customizable (for example, a user or administrator may add or remove relevant columns form the viewer). Some example columns of included data fields may include environment 334, software or service 338, stack 340 (for example, a data structure used to store a collection of objects), type 342 (for example, service, trace, request, or event), log count (not shown, but for example, the number of times the log line was recorded in various logs searched), and the ability to view multiple logs (not shown). These columns may allow organizing of the events in ascending or descending order.

Turning to FIG. 3B, this example user interface 350 may appear after a user selects one of the log lines displayed in FIG. 3A. For example, FIG. 3B is displayed after a user selects the log line 336 and the user scrolls through to line 84 in the log.

User interface 350 shows that a level search was entered in the screen shown in FIG. 3A (the result of the search is not shown in FIG. 3A). Time zone 352 can be adjusted to the local time zone, a custom time zone, or one of the originating log.

Various columns may be displayed showing data from the log of the originating log line selected from FIG. 3A. Columns may include the time 356 (for example, the time may adjust according to the setting of the time zone 352), traceid 358 (for example, a unique identifying alphanumeric code associated with the event or error, which in this case would be an error based on the search criteria), level (for example, error), message (for example, a description of the log line or event), parameters (for example, any software or environment parameters associated with the event), origin (for example, the host or service the created the log line), or stacktrace (for example, information related to the active stack frames at a certain point in time during the execution of a service or program). In one application, users may use the time 356 to determine how much time passed in the environment before the error was encountered. This information, and others, can help a user debug or address an error more effectively and efficiently.

For a particular log line 354, a user may select additional options to interact with the log line 354. For example, if a user selects the message cell in log line 354 an options box 370 may appear allowing the user several options to select to modify the search. In one embodiment, the user may: modify the search filter to find all log lines in the currently opened log including a same or similar message, modify the search filter to find all log lines in all or a subset of available logs including a same or similar message, modify the search filter to find all log lines in the currently opened log that do not include a same or similar message, modify the search filter to find all log lines in all or a subset of available logs that do not include a same or similar message. Additionally, the user may also select an option to copy the message text. Similar options may appear for each individual cell, for example similar options may appear for traceid 358 if a user selects a cell in that column.

Figure 4:
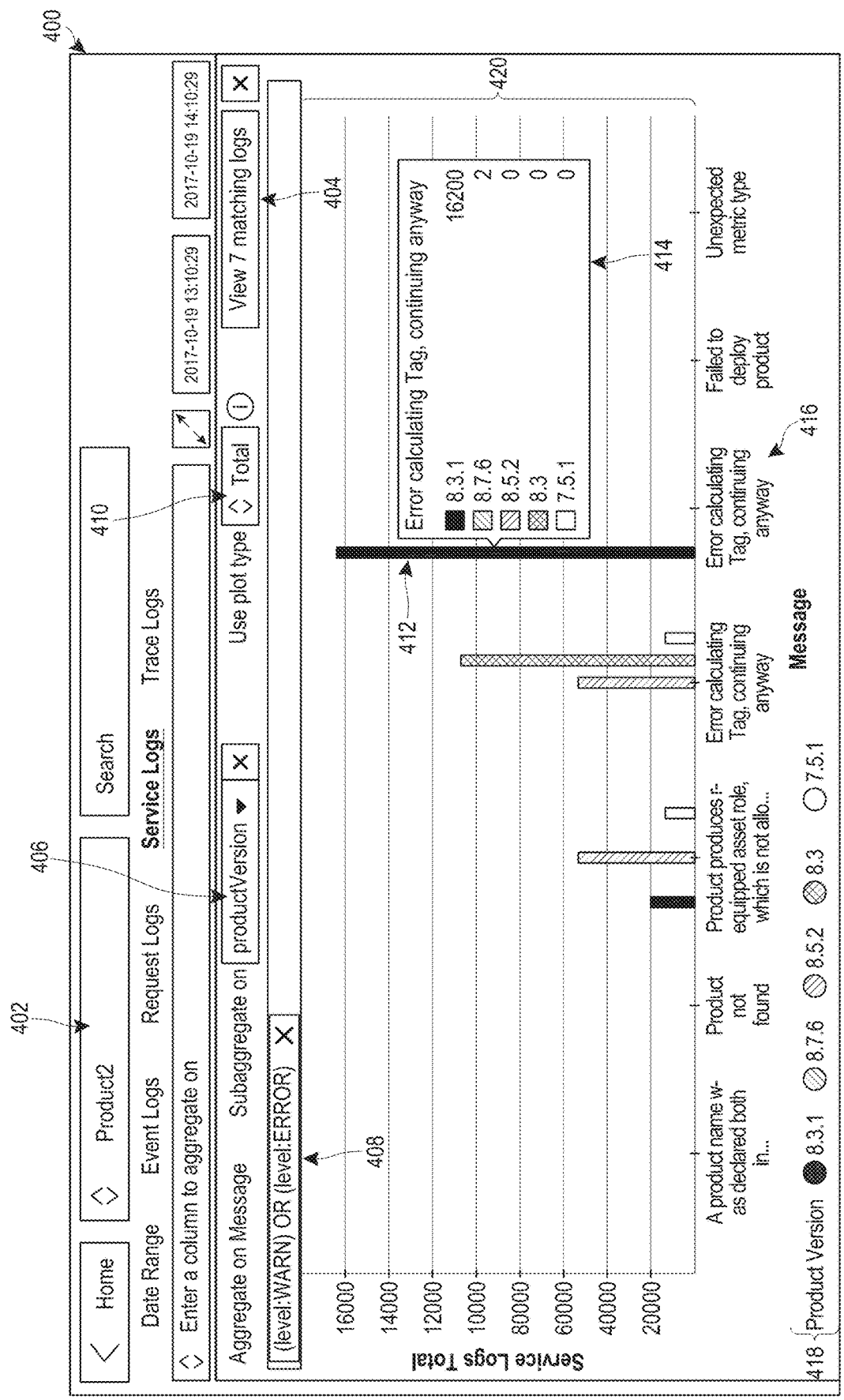
FIG. 4 illustrates an example graphical user interface including bar chart features related to a view of aggregations or histograms for a specific service on a central server or Dynamic Data Search System.

Turning to FIG. 4, FIG. 4 illustrates an example graphical user interface 400 including bar chart features related to viewing of log entry aggregations or histograms associated with a specific service. This example user interface page allows a user to view and analyze what is happening in aggregate across multiple systems (e.g., multiple hosts and services operated by an organization) based on all event data (or sanitized logs) received. Search 402 allows a user to enter a product or service to search by across all event data. Several filters and formatting may be available to the user, for example a user may select a subaggregation category 406, such as product version. Plot types 410 may also be selectable, for example the user may plot the total number of events in the corresponding resulting search in the form of a histogram 420 as shown in FIG. 1B. Additionally, in some embodiments, a user may have the option 404 to view all matching logs the data incorporated into the chart or graph is based on.

Search filter 408 shows what the graph's search is based on. In FIG. 4, any events with a level of warning or error is searched in aggregate in addition to at least the search parameters 402.

In the histogram or graph 420, there are error or warning messages on the x-axis and service log totals on the y-axis. In some embodiments, different analytical graphs and charts may be generated for different types of searches, search term(s) (for example, by time, 402, 406, 408, or others), and/or visualization type 410.

In this example, the graph 420 displays a bar 412 for product version 0.8.0 that appears to have 171310 warnings or errors associated with that product version and message as displayed in the details box 414 (for example, the detail box 414 displays the exact values of the x and y coordinates for the data in the graph 420. The details box 414 may be displayed upon selecting or hovering over a particular set of data on the graph 420. The legend 418 may also appear on the screen, showing, for example, product version in this embodiment. In other embodiments, other options in the subaggregation category 406 may cause the system to display other relevant information. In FIG. 4, versions other than 0.8.0 appear to have fewer warnings and errors. It may be advantageous to view and analyze data in this way to provide advice to users indicating variations in errors (or other event data), as well as developing a strategy to addressing such warnings and errors (for example, the most instances of errors may be addressed first, or the most critical errors may be addressed first, or a both based on an assessment). For example, based on FIG. 4, a user may advise hosts to avoid version 0.8.0 of the "Product2" product or service and begin debugging the error on the version of the software.

Figure 5:
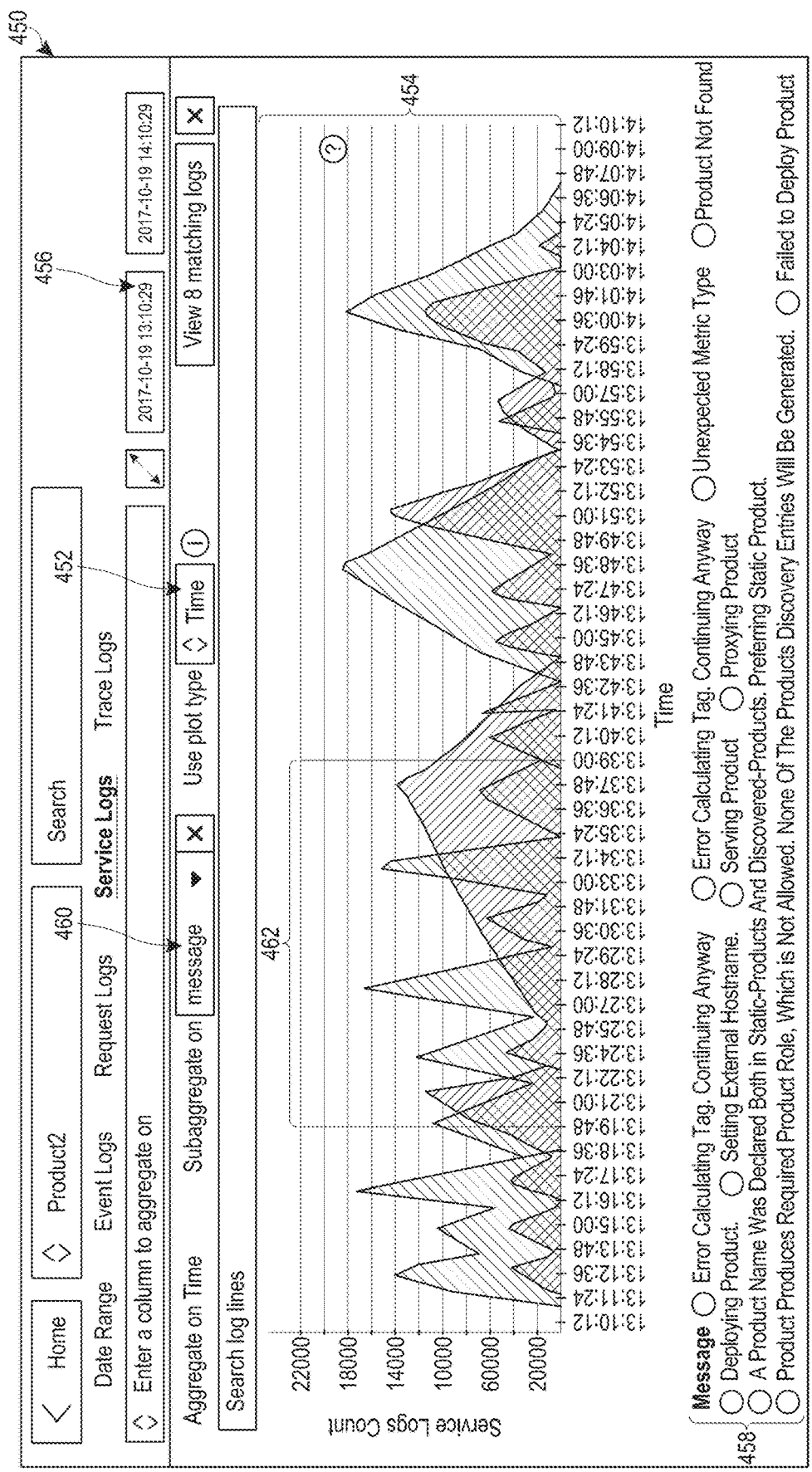
FIG. 5 illustrates an example of a graphical user interface including features related to aggregations for a specific service on a central server or Dynamic Data Search System.

FIG. 5 illustrates an example of a graphical user interface 450 including features related to aggregations for a specific service. FIG. 5 includes some user interface features similar to FIG. 4, and uses the same data to show a plot type 452 of time rather than total. In this embodiment, the graph 454 displays service log count on the y-axis and time on the x-axis. The time starts and ends at the time 456, which was used as a search parameter. Also, in one embodiment, the messages searches appear as various colors on the graph, similar to FIG. 4, as displayed in the legend 458. However, product version is absent in this graph because the subaggregation category 460 was changed to messages instead of product version in FIG. 4.

In some embodiments, a user may select a range of times 462 to view in another graph based on the set of log lines selected. This effectively zooms in on the data selected so that a user may see an exploded view of the particular range of times 462 of specific log lines. Also, in some implementations a detail box similar to 414 may be displayed upon hovering or selecting data in the graph 454. The detail box, in this example, may also show total counts of errors or warnings for each message.

Figure 6:
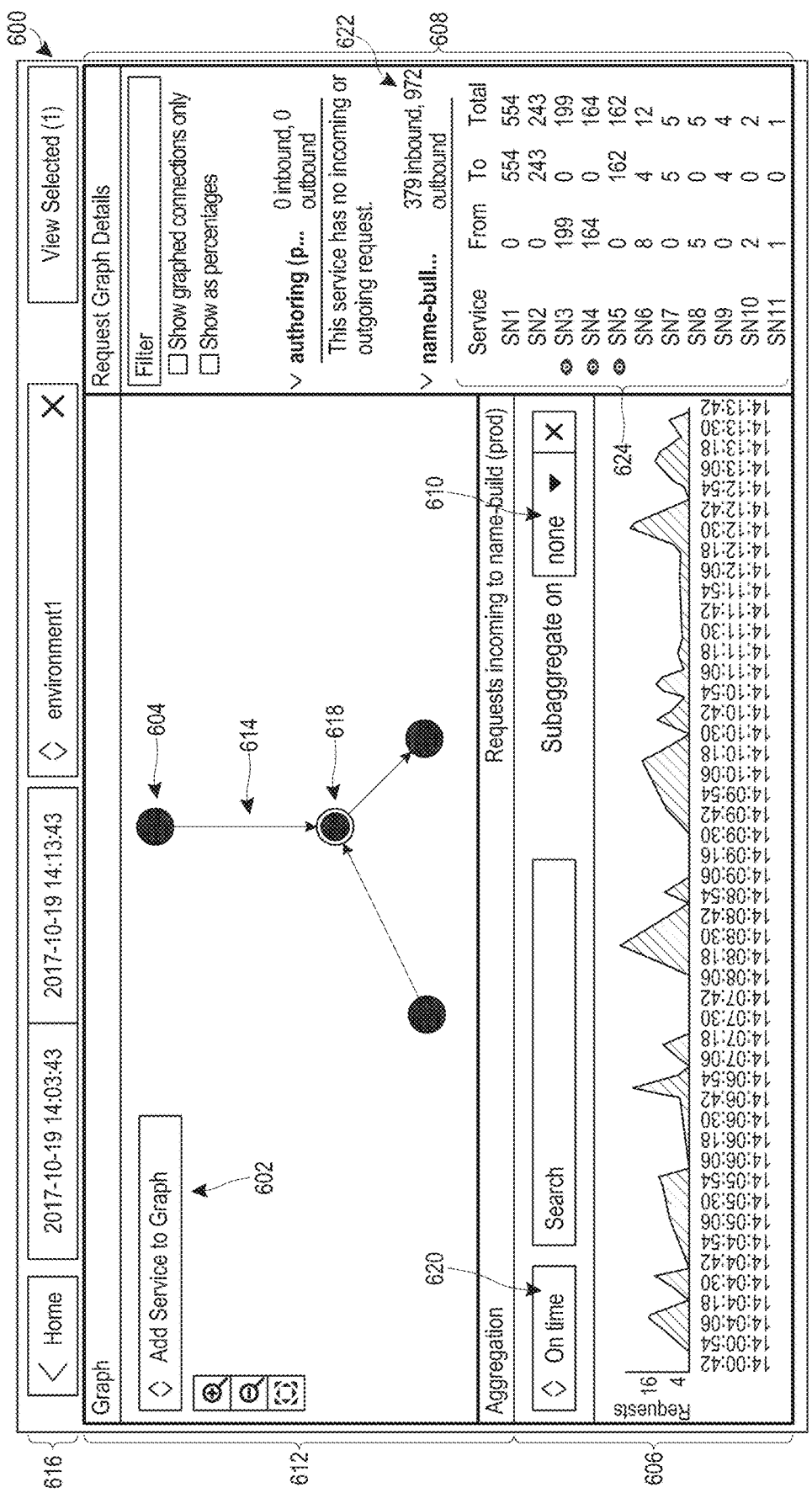
FIG. 6 illustrates an example graphical user interface related to flow of traffic between various services.

FIG. 6 illustrates an example graphical user interface 600 related to flow of traffic between various services. The user interface may include several sections that a user may manipulate the size of on the screen, expand to full screen, or hide completely in some embodiments. Such sections may include a searching pane 616 (which may be similar to the searching pane described above), a graph section 612, an aggregation section 606, a graph detail section 608, and any other section relevant to the user (for example, other interfaces described herein). In some embodiments, upon selection of a service (e.g., by selecting in one of the user interfaces of FIG. 4 or 5) causes automatic generation of a "related services" visualization, such as the nodes and edges type visualization in FIG. 6. Such an auto-generated visualization may be based on log files that have one or more of the same (or similar) identifiers (e.g., trace ID).

In the example depicted in FIG. 6, a user may add services to the graph by selecting the add service button 602 and selecting or typing in a desired service. In some embodiments, upon selection of a service, the selected service (for example, 604) appears in a graph section 612. As additional services are selected, links 614 may be graphically drawn between services that have a relationship or communicate with one another.

In some embodiments, upon selection of a service in the graph section 612, the system may generate and display a graph in the aggregation section 606 based on the selected service 618. Options to modify the graph may be provided, for example to change the subaggregation setting 610 may be provided as well as the format 620 of the graph. The aggregation section 606 may be similar to the graph discussed above in FIG. 5.

The graph detail section 608 may provide a user the ability to filter data, display the graph in the graph section 612 differently, display the graph in the aggregation section 606 differently, and display various details regarding traffic flow to the services selected for the graph section 612 graph. For example, details 622 and 624 regarding traffic flow may include what services communicate with the particular service as incoming or outbound traffic for each request logged.

Figure 7A:
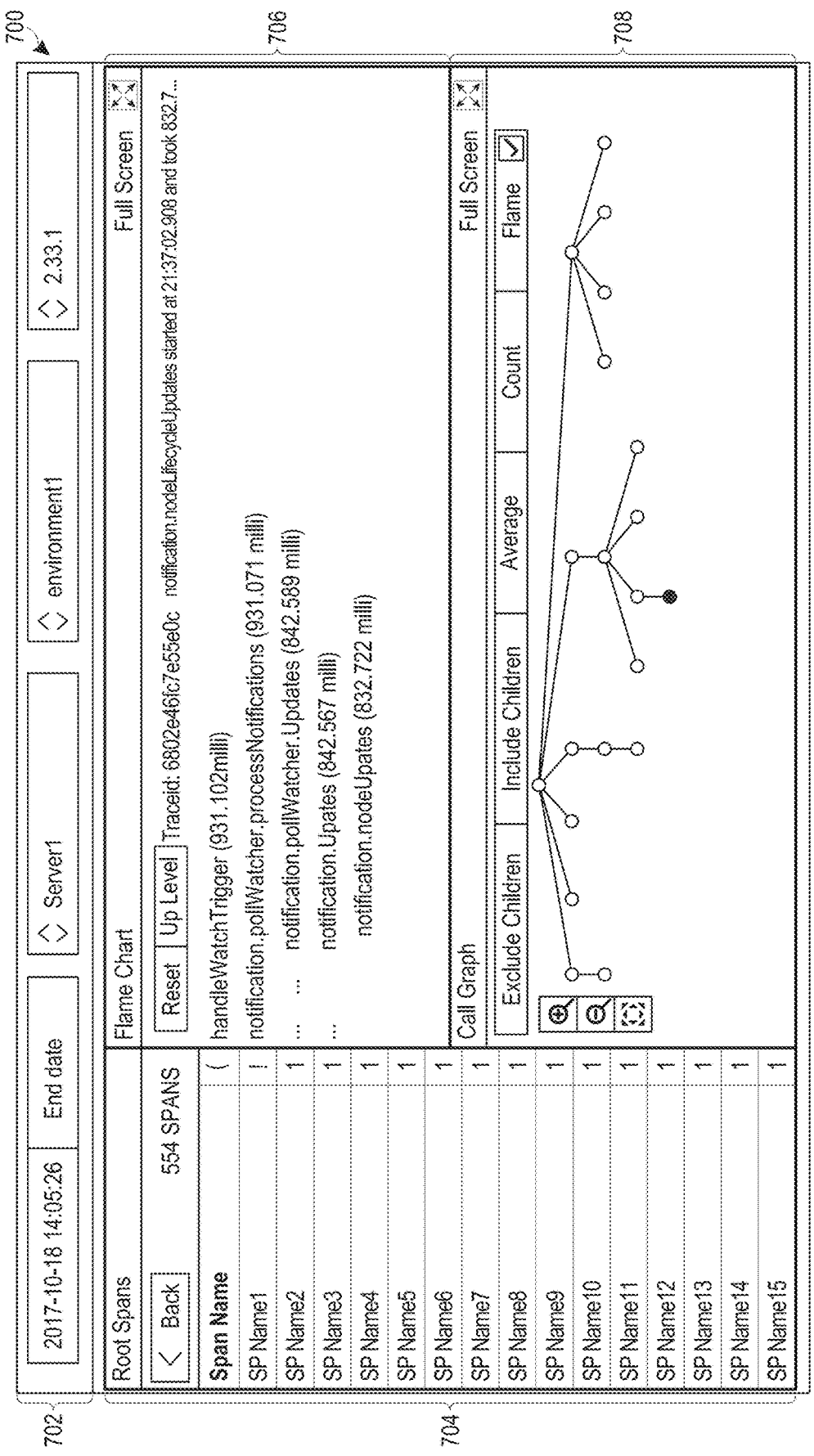
FIG. 7A illustrates an example graphical user interface including a flame chart indicate time slots associated with various processes and sub-processes.

FIG. 7A illustrates an example graphical user interface including a flame chart indicate time slots associated with various processes and sub-processes. The user interface in FIG. 7A may include several sections that a user may manipulate the size of on the screen, expand to full screen, or hide completely in some embodiments. Such sections may include a searching pane 702 (which may be similar to the searching panes described above allowing for searching and filtering based on time, product, environment, and product version, for example), a root spans section 704, a flame chart section 706, a call graph section 708, and any other section relevant to the user (for example, other interfaces described herein).

The flame chart 706 allows a user to graphically see how long particular parts of a service or application take to execute. It can be advantageous to see the length of time particular portions of a service take to execute to determine the bottlenecks of the program or which portion may be causing the error. This would allow a user to focus efforts on the inefficient or error-prone sections. In some embodiments, the processes that took the longest times to execute are shown first and a user can select particular processes to view any sub-processes within the selected process. In other embodiments, all processes may be displayed with the option to zoom in and out to see the relative time each process took based on the length of the visual representation in the flame chart. It may be advantageous to load a subset of processes at a given time so that users can review relevant and related information and/or so the system may load the information more quickly.

In one embodiment, the root span section 704 shows processes spanned by a particular service that appear on the flame chart 706. Several processes or spans may take more time to execute than others as depicted in the flame chart 706.

Figure 7B:
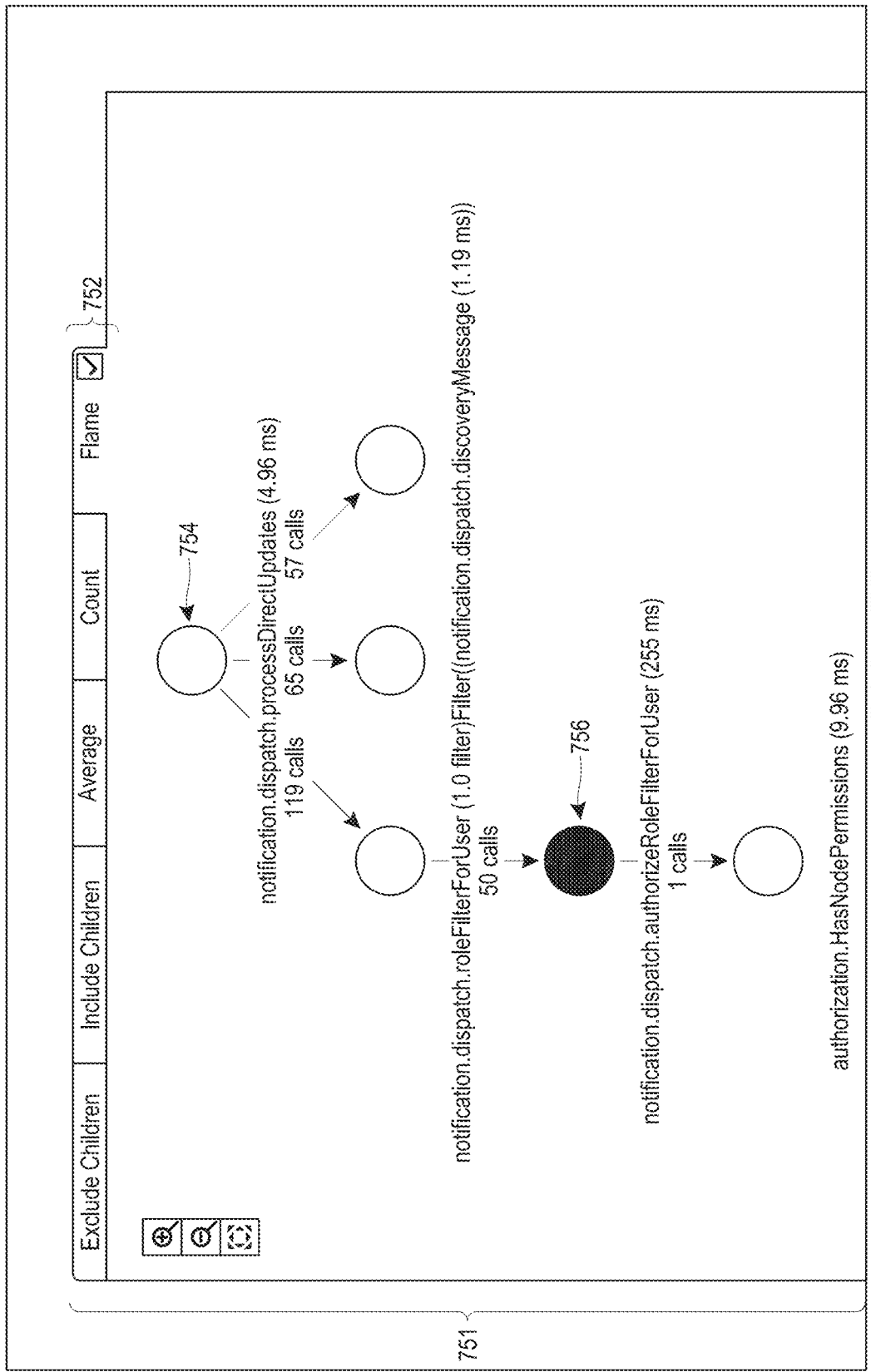
FIG. 7B illustrates an example graphical user interface including a call graph chart related to a generated flame chart similar to the flame chart depicted in FIG. 7A.

One embodiment of the call graph section 708 is shown in more detail in FIG. 7B. FIG. 7B, for example, illustrates a graphical user interface 750 including a call graph 751 related to a generated flame chart similar to the flame chart depicted in FIG. 7A. Data on the call graph 751 may include number of calls being made by processes to other processes, which calls are being made for a specific service (for example, to which processes), time to execute (for example, from the flame chart), and/or an indicator of length of time to execute (for example, longer times to execute may appear red and faster times green with anything between a mixture of the colors). In one embodiment, the indicator of length of time to execute may be green for node 754 and red for 756.

Artificial Intelligence/Machine Learning Language

In some embodiments, the Dynamic Data Search System may use machine learning to predict or solve errors based on the received sanitized event data. Further, the Dynamic Data Search Engine may use machine learning to filter out any proprietary data a host (via its agent) may have inadvertently sent to the Dynamic Data Search System. It would be advantageous to either automatically remove any sensitive data prior to any review by a user, or flag such sensitive data to be reviewed by a designated administrator or user prior to incorporating the potentially sensitive data into the log pipeline to be access and viewed by users.

Machine learning is a subset of artificial intelligence that iteratively learns from data without being explicitly programmed. Thus, a computing device configured to use machine learning techniques to perform an action can learn how to perform the action without being explicitly programmed. Accordingly, the machine learning techniques improve the functionality of the computing device itself because the machine learning techniques allow the computing device to learn, and thereby produce more accurate detections of instances of suspected misuse, without being explicitly programmed. The Dynamic Data Search System may permit, among other aspects, improved sensitive data detection through iterative machine learning.

Additional Implementation Details and Embodiments

Various embodiments of the present disclosure may be a system, a method, and/or a computer program product at any possible technical detail level of integration. The computer program product may include a computer readable storage medium (or mediums) having computer readable program instructions thereon for causing a processor to carry out aspects of the present disclosure.

For example, the functionality described herein may be performed as software instructions are executed by, and/or in response to software instructions being executed by, one or more hardware processors and/or any other suitable computing devices. The software instructions and/or other executable code may be read from a computer readable storage medium (or mediums).

The computer readable storage medium can be a tangible device that can retain and store data and/or instructions for use by an instruction execution device. The computer readable storage medium may be, for example, but is not limited to, an electronic storage device (including any volatile and/or non-volatile electronic storage devices), a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a solid state drive, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (for example, light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions (as also referred to herein as, for example, "code," "instructions," "module," "application," "software application," and/or the like) for carrying out operations of the present disclosure may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. Computer readable program instructions may be callable from other instructions or from itself, and/or may be invoked in response to detected events or interrupts. Computer readable program instructions configured for execution on computing devices may be provided on a computer readable storage medium, and/or as a digital download (and may be originally stored in a compressed or installable format that requires installation, decompression or decryption prior to execution) that may then be stored on a computer readable storage medium. Such computer readable program instructions may be stored, partially or fully, on a memory device (for example, a computer readable storage medium) of the executing computing device, for execution by the computing device. The computer readable program instructions may execute entirely on a user's computer (for example, the executing computing device), partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart(s) and/or block diagram(s) block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks. For example, the instructions may initially be carried on a magnetic disk or solid-state drive of a remote computer. The remote computer may load the instructions and/or modules into its dynamic memory and send the instructions over a telephone, cable, or optical line using a modem. A modem local to a server computing system may receive the data on the telephone/cable/optical line and use a converter device including the appropriate circuitry to place the data on a bus. The bus may carry the data to a memory, from which a processor may retrieve and execute the instructions. The instructions received by the memory may optionally be stored on a storage device (for example, a solid-state drive) either before or after execution by the computer processor.

The flowchart and block diagrams in the Figures illustrate the architecture, functionality, and operation of possible implementations of systems, methods, and computer program products according to various embodiments of the present disclosure. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. In addition, certain blocks may be omitted in some implementations. The methods and processes described herein are also not limited to any particular sequence, and the blocks or states relating thereto can be performed in other sequences that are appropriate.

It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions. For example, any of the processes, methods, algorithms, elements, blocks, applications, or other functionality (or portions of functionality) described in the preceding sections may be embodied in, and/or fully or partially automated via, electronic hardware such application-specific processors (for example, application-specific integrated circuits (ASICs)), programmable processors (for example, field programmable gate arrays (FPGAs)), application-specific circuitry, and/or the like (any of which may also combine custom hard-wired logic, logic circuits, ASICs, FPGAs, etc. with custom programming/execution of software instructions to accomplish the techniques).

Any of the above-mentioned processors, and/or devices incorporating any of the above-mentioned processors, may be referred to herein as, for example, "computers," "computer devices," "computing devices," "hardware computing devices," "hardware processors," "processing units," and/or the like. Computing devices of the above-embodiments may generally (but not necessarily) be controlled and/or coordinated by operating system software, such as Mac OS, iOS, Android, Chrome OS, Windows OS (for example, Windows XP, Windows Vista, Windows 7, Windows 8, Windows 10, Windows Server, etc.), Windows CE, Unix, Linux, SunOS, Solaris, Blackberry OS, VxWorks, or other suitable operating systems. In other embodiments, the computing devices may be controlled by a proprietary operating system. Conventional operating systems control and schedule computer processes for execution, perform memory management, provide file system, networking, I/O services, and provide a user interface functionality, such as a graphical user interface ("GUI"), among other things.

Figure 8:
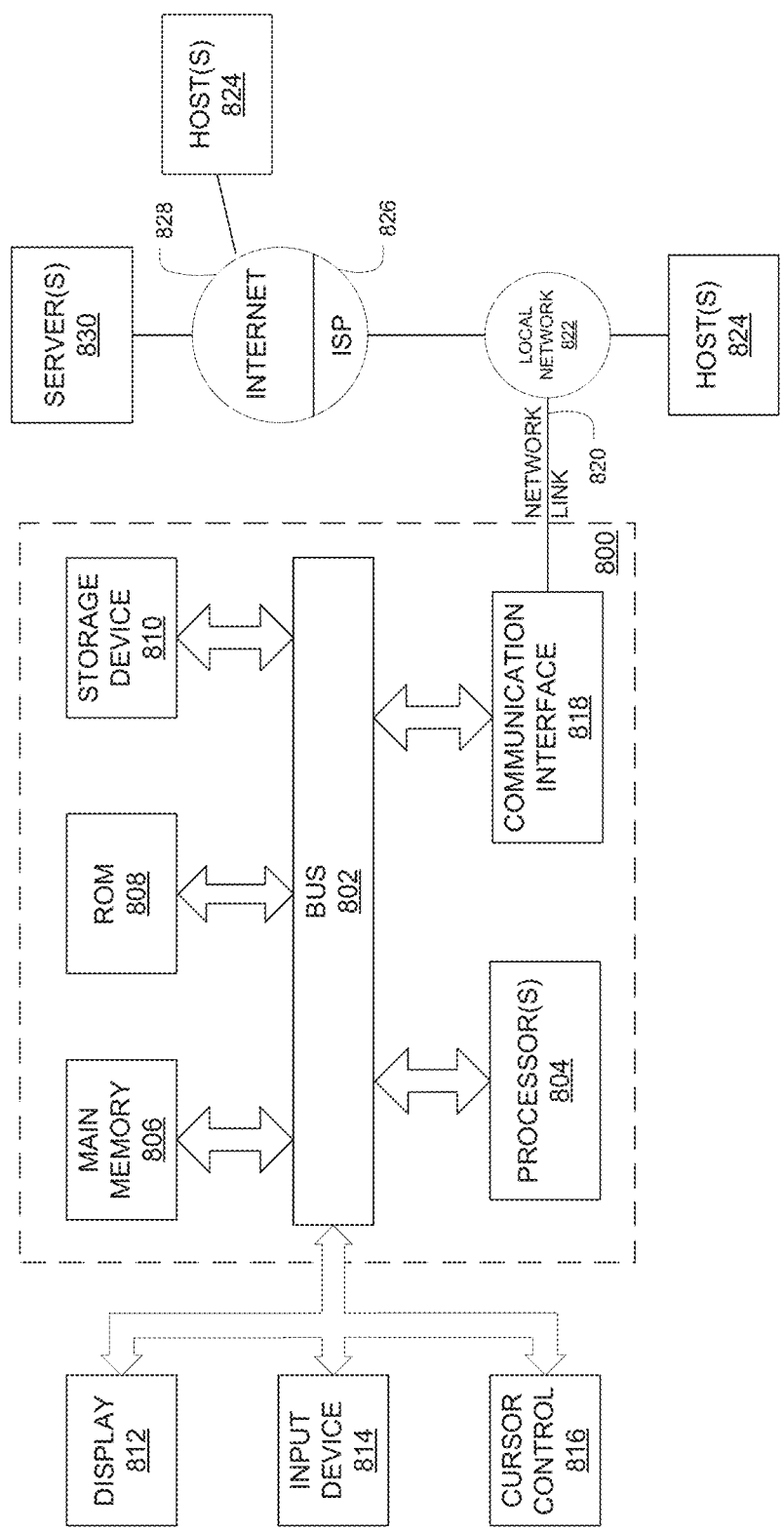
FIG. 8 illustrates a block diagram of an example computer system with which certain methods discussed herein may be implemented.

For example, FIG. 8 is a block diagram that illustrates a computer system 800 upon which various embodiments may be implemented. The Computer system may be the same or similar to the Dynamic Data Search System, the Database System, Host(s), or User(s) described above. The computer system 800 includes a bus 802 or other communication mechanism for communicating information, and a hardware processor, or multiple processors, 804 coupled with bus 802 for processing information. Hardware processor(s) 804 may be, for example, one or more general purpose microprocessors.

Computer system 800 also includes a main memory 806, such as a random access memory (RAM), cache and/or other dynamic storage devices, coupled to bus 802 for storing information and instructions to be executed by processor 804. Main memory 806 also may be used for storing temporary variables or other intermediate information during execution of instructions to be executed by processor 804. Such instructions, when stored in storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or USB thumb drive (Flash drive), etc., is provided and coupled to bus 802 for storing information and instructions.

Computer system 800 may be coupled via bus 802 to a display 812, such as a cathode ray tube (CRT) or LCD display (or touch screen), for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (for example, x) and a second axis (for example, y), that allows the device to specify positions in a plane. In some embodiments, the same direction information and command selections as cursor control may be implemented via receiving touches on a touch screen without a cursor.

Computing system 800 may include a user interface module to implement a GUI that may be stored in a mass storage device as computer executable program instructions that are executed by the computing device(s). Computer system 800 may further, as described below, implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor(s) 804 executing one or more sequences of one or more computer readable program instructions contained in main memory 806. Such instructions may be read into main memory 806 from another storage medium, such as storage device 810. Execution of the sequences of instructions contained in main memory 806 causes processor(s) 804 to perform the process steps described herein. In alternative embodiments, hard-wired circuitry may be used in place of or in combination with software instructions. For example, sequences of instructions may also be in the search engine 204, display engine 206, processing engine 208, and communication engine 210.

Various forms of computer readable storage media may be involved in carrying one or more sequences of one or more computer readable program instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN (or WAN component to communicated with a WAN). Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

Figure 9:
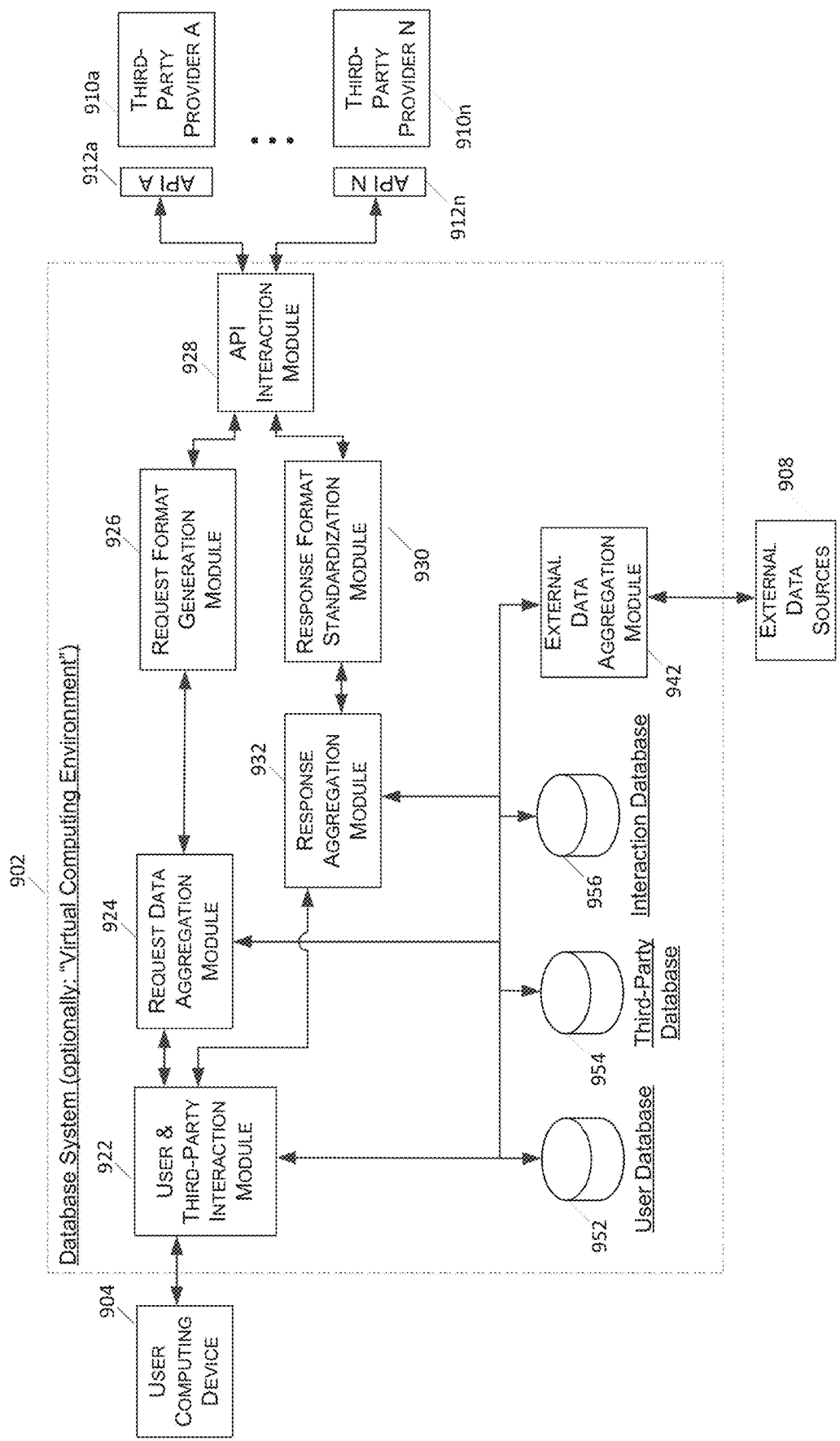
FIG. 9 is a block diagram showing various aspects of a database system and network environment in which the database system may be implemented, according to various embodiments of the present disclosure.

FIG. 9 is a block diagram showing various aspects of a database system 902 and network environment in which the database system 902 may be implemented, according to various embodiments of the present disclosure. The database system 902 may be the same or similar to the Dynamic Data Search System described above. As shown in FIG. 9, the database system 902 includes various modules and databases, and it communicates with various external devices and systems. Specifically, according to an embodiment the database system 902 includes a user and third-party interaction module 922, a request data aggregation module 924, a request format generation module 926, an API interaction module 928, a response format standardization module 930, a response aggregation module 932, an external data aggregation module 942, a user database 152, a third-party database 154, and an interaction database 956. The database system 902, according to an embodiment, may communicate with various external devices and systems, including a user computing device 904, one or more external data sources 908, and one or more APIs 912*a-n* that are associated with respective third-parties 910*a-n*.

As described below, the various modules of the database system 902 may comprise computer readable program instructions that may, in some embodiments, be logically divided as shown in FIG. 9 (for purposes of clarify and illustration), or may, in other embodiments, be combined or organized differently. Further, in some implementations aspects of the modules of the database system 902 may be organized differently or performed in parallel. For example, aggregation and analysis of responses (an aspect described in reference to response aggregation module 932 below) may be performed in parallel with, or before, standardization of responses (an aspect described in reference to response format standardization module 930 below).

In various embodiments, the various external devices and systems may communicate with the database system 902 via any suitable communications medium or protocol. For example, the various external devices and systems may communicate with the database system 902, and/or with one another, via any combination of local and remote network, the Internet, wired or wirelessly, and/or the like. Further, in various embodiments aspects of any of the modules and/or databases of the database system 902, and/or the various external devices and systems, may be organized differently from what is shown in the example illustration of FIG. 9. For example, in some implementations the database system 902 may be comprised of multiple separate computing systems or devices and may communicate with one another to accomplish the functionality described herein.

User and third-party interaction module 922 provides an interface, such as a GUI to user computing devices, such as user computing device 904. Interaction module 922 may be configured to store data received from user computing device 904 in a user database 952, and to store data received from a third-party A 910*a* in a third-party database 154. For example, a user may provide, through user computing device 904, various data to third-parties. Similarly, a third-party (or host, for example) may provide information related to the third party. Interaction module 922 may also receive, from both user computing device 904 and/or third-party data.

User and third-party interaction module 922 may also receive an indication from user computing device 904 that a user is willing to interact with one or more third-parties, such as third-party A 910*a* to third-party N 910*n*. Similarly, user and third-party interaction module 922 may receive an indication from a third-party that a third-party would be willing to enter into such a transaction with a user.

User and third-party interaction module 922 may be configured to generate user interface data useable for rendering the various interactive user interfaces described herein, so as to enable receipt and providing of data to, for example, users and third-parties. The user interface data may be used by the system, and/or another computer system, device, and/or software program (for example, a browser program), to render the interactive user interfaces. The interactive user interfaces may be displayed on, for example, electronic displays (including, for example, touch-enabled displays) of, for example, user computing device 904.

Advantageously, because user and third-party interaction module 922 and request data aggregation module 924 have access to user database 952 and third-party databases 954 (among other aspects and modules of the database system 902), interaction module 922 and request data aggregation module 924 may have a comprehensive view of an interaction, and various transactions associated with the interaction, as well as information about participants in these interactions. As such, interaction module 922 and/or request data aggregation module 924 may receive and package the relevant information from these databases into a request.

Request data aggregation module 924 may, additionally, combine or enhance the data stored within database system 902 with external data through external data aggregation module 942. External data aggregation module 942 may access one or more external data sources 908 to request and receive additional data related to a user, a third-party, an interaction, or other entity associated with an interaction. Examples of external data sources 908 may include public records (for example, government records of names, addresses, and phone numbers, etc.), credit-related data sources, a similar user-entity's database, and/or the like. The external data aggregation module 942 may communicate with the external data sources 908 via any suitable method, including, for example, via API requests, screen scraping, electronic messages, and/or the like.

The information stored in database system 902 may be combined with the external data from data aggregation module 942 in user and third-party interaction module 922. Advantageously, user and third-party interaction module 922 may utilize information related to a user, a third-party, an interaction, and other information (for example, any information obtained by the external data aggregation module 942 from the external data sources 908). Request data aggregation module 924 may then package, or aggregate, the various items of information, including information related to a user from user database 952, information related to a third-party from third-party database 954, information related to an interaction from interaction database 956, and external data obtained from external data aggregation module 942.

The aggregated data may then be passed to the request format generation module 926. The request format generation module 926 may format, or convert, the data into one or more formats suitable for transmission to third-parties. For example, third-party A 910a may require information transmitted to it to be in a particular binary format, and only comprise certain pieces of information or fields. Third-party N 910n may, conversely, require that information transmitted to it be in a hypertext format and contain certain different fields. Request format generation module 926 may accommodate these different structures and formats for each third-party by referring to format templates stored by the system and associated with each third-party. API interaction module 928 then receives the information, appropriately formatted for each third-party, from request format generation module 926, and transmits it to the various third-parties through their respective APIs. For example, API interaction module 928 may transmit the request as formatted for third-party A 910a through API A, to third-party A 910a. API interaction module 928 may iterate through all potential third-parties, eventually reaching third-party N 110n and accessing that third-party through API N 112n. In some implementations, the user and/or third-party may specify particular third-parties of interest, and to which the system may transmit the information. In various embodiments, different third-parties may be more appropriate than others for particular requests, and the system may determine using various user generated input particular third-party parties to provide the information to.

API interaction module 928 additionally receives responses from the various third-parties through their respective APIs. API interaction module 928 then forwards the received responses to response format standardization module 930, where the various third-parties structures and formats are converted into a common format (as described further below). Response aggregation module 932 gathers the standardized responses from the various third-parties and stores them in the various databases, including user database 952, third-party database 954, and/or interaction database 956, as appropriate. Additionally, response aggregation module 932 may determine particular responses that are to be passed to the interaction module 922 for display in a user interface. For example, as described below, the system may identify the most useful, or best, or a prioritized list of, responses to display to a user. The system may also, by the response aggregation module 932, determine that, for example, a threshold number of responses have not been received, and/or a quality of the responses does not meet a threshold. In such an instance, the system may determine not to present responses to the user.

As indicated in FIG. 9, in an implementation the database system 902 (or one or more aspects of the database system 902) may comprise, or be implemented in, a "virtual computing environment". As used herein, the term "virtual computing environment" should be construed broadly to include, for example, computer readable program instructions executed by one or more processors (for example, as described below in the example of FIG. 8) to implement one or more aspects of the modules and/or functionality described herein. Further, in this implementation, one or more modules (for example, user and third-party interaction module 922, request data aggregation module 924, request format generation module 926, API interaction module 928, response format standardization module 930, response aggregation module 932, and/or external data aggregation module 942) of the database system 902 may be understood as comprising one or more rules engines of the virtual computing environment that, in response to inputs received by the virtual computing environment, execute rules and/or other program instructions to modify operation of the virtual computing environment. For example, a request received from the user computing device 904, or user as described above, may be understood as modifying operation of the virtual computing environment to cause the request data aggregation module 924 to gather data associated with the request, the request format generation module 926 to generate third-party requests with the appropriate formats and information, and the API interaction module 928 to transmit those requests to one or more APIs. Such functionality may comprise a modification of the operation of the virtual computing environment in response to inputs and according to various rules. Other functionality implemented by the virtual computing environment (as described throughout this disclosure) may further comprise modifications of the operation of the virtual computing environment, for example, the operation of the virtual computing environment may change depending on the information gathered by the request data aggregation module 924 and/or responses received and analyzed by the response aggregation module 932. Initial operation of the virtual computing environment may be understood as an establishment of the virtual computing environment. In some implementations the virtual computing environment may comprise one or more virtual machines or other emulations of a computing system. In some implementations the virtual computing environment may comprise a hosted computing environment that includes a collection of physical computing resources that may be remotely accessible and may be rapidly provisioned as needed (commonly referred to as "cloud" computing environment).

Implementing one or more aspects of the database system 902 as a virtual computing environment may advantageously enable executing different aspects or modules of the system on different computing devices or processors, which may increase the scalability of the system. Implementing one or more aspects of the database system 902 as a virtual computing environment may further advantageously enable sandboxing various aspects, data, or modules of the system from one another, which may increase security of the system by preventing, for example, malicious intrusion into the system from spreading. Implementing one or more aspects of the database system 902 as a virtual computing environment may further advantageously enable parallel execution of various aspects or modules of the system, which may increase the scalability of the system. Implementing one or more aspects of the database system 902 as a virtual computing environment may further advantageously enable rapid provisioning (or de-provisioning) of computing resources to the system, which may increase scalability of the system by, for example, expanding computing resources available to the system or duplicating operation of the system on multiple computing resources. For example, the system may be used by thousands, hundreds of thousands, or even millions of users simultaneously, and many megabytes, gigabytes, or terabytes (or more) of data may be transferred or processed by the system, and scalability of the system may enable such operation in an efficient and/or uninterrupted manner.

For example, as described above, there may be up to hundreds (or more) hosts processing and sending sanitized event data to the database system 902. Being able to scale with the constant receipt of vast amounts of data would be advantageous to processing and reviewing the sanitized data as quickly and efficiently as possible, with as many users as desired.

Additionally, in some implementations communications with one or more API's may be encrypted and/or authenticated. For example, public and/or private key exchanges may take place to establish authenticated and/or encrypted communications between, for example, the system and computing systems of third-parties, to, for example, protect user data from exposure to potentially malicious actors.

As described above, in various embodiments certain functionality may be accessible by a user through a web-based viewer (such as a web browser), or other suitable software program). In such implementations, the user interface may be generated by a server computing system and transmitted to a web browser of the user (for example, running on the user's computing system). Alternatively, data (for example, user interface data) necessary for generating the user interface may be provided by the server computing system to the browser, where the user interface may be generated (for example, the user interface data may be executed by a browser accessing a web service and may be configured to render the user interfaces based on the user interface data). The user may then interact with the user interface through the web-browser. User interfaces of certain implementations may be accessible through one or more dedicated software applications. In certain embodiments, one or more of the computing devices and/or systems of the disclosure may include mobile computing devices, and user interfaces may be accessible through such mobile computing devices (for example, smartphones and/or tablets).

Many variations and modifications may be made to the above-described embodiments, the elements of which are to be understood as being among other acceptable examples. All such modifications and variations are intended to be included herein within the scope of this disclosure. The foregoing description details certain embodiments. It will be appreciated, however, that no matter how detailed the foregoing appears in text, the systems and methods can be practiced in many ways. As is also stated above, it should be noted that the use of particular terminology when describing certain features or aspects of the systems and methods should not be taken to imply that the terminology is being re-defined herein to be restricted to including any specific characteristics of the features or aspects of the systems and methods with which that terminology is associated.

Conditional language, such as, among others, "can," "could," "might," or "may," unless specifically stated otherwise, or otherwise understood within the context as used, is generally intended to convey that certain embodiments include, while other embodiments do not include, certain features, elements, and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

The term "substantially" when used in conjunction with the term "real-time" forms a phrase that will be readily understood by a person of ordinary skill in the art. For example, it is readily understood that such language will include speeds in which no or little delay or waiting is discernible, or where such delay is sufficiently short so as not to be disruptive, irritating, or otherwise vexing to a user.

Conjunctive language such as the phrase "at least one of X, Y, and Z," or "at least one of X, Y, or Z," unless specifically stated otherwise, is to be understood with the context as used in general to convey that an item, term, etc. may be either X, Y, or Z, or a combination thereof. For example, the term "or" is used in its inclusive sense (and not in its exclusive sense) so that when used, for example, to connect a list of elements, the term "or" means one, some, or all of the elements in the list. Thus, such conjunctive language is not generally intended to imply that certain embodiments require at least one of X, at least one of Y, and at least one of Z to each be present.

The term "a" as used herein should be given an inclusive rather than exclusive interpretation. For example, unless specifically noted, the term "a" should not be understood to mean "exactly one" or "one and only one"; instead, the term "a" means "one or more" or "at least one," whether used in the claims or elsewhere in the specification and regardless of uses of quantifiers such as "at least one," "one or more," or "a plurality" elsewhere in the claims or specification.

The term "comprising" as used herein should be given an inclusive rather than exclusive interpretation. For example, a general purpose computer comprising one or more processors should not be interpreted as excluding other computer components, and may possibly include such components as memory, input/output devices, and/or network interfaces, among others.

While the above detailed description has shown, described, and pointed out novel features as applied to various embodiments, it may be understood that various omissions, substitutions, and changes in the form and details of the devices or processes illustrated may be made without departing from the spirit of the disclosure. As may be recognized, certain embodiments of the inventions described herein may be embodied within a form that does not provide all of the features and benefits set forth herein, as some features may be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A computing system comprising:
one or more computer readable storage devices configured to store a plurality of computer executable instructions; and
one or more hardware computer processors in communication with the one or more computer readable storage devices and configured to execute the plurality of computer executable instructions in order to cause the computing system to:
generate electronic instructions comprising logging specifications for generating sanitized log files that are based at least in part on one or more log files associated with events performed by each of multiple software services executed by each of a plurality of remote hosts;
transmit, to each of the plurality of remote hosts by one or more networks, the electronic instructions, wherein the logging specifications include configurable rules for each of the plurality of remote hosts to automatically execute to determine data that is uploaded to a log pipeline so that the sanitized log files generated by each of the plurality of remote hosts include a subset of the data included in the one or more log files such that sensitive user data captured by each of the plurality of remote hosts is removed from the one or more log files by the plurality of remote hosts while generating the sanitized log files, and wherein the subset of the data included in the one or more log files is further generated to be in a uniform data format that is in compliance with the configurable rules;
electronically receive, from each of the plurality of remote hosts by one or more networks, the sanitized log files;
index the sanitized log files into an indexed searching platform, wherein the indexing is based at least in part on the sanitized log files being in the uniform data format that is in compliance with the configurable rules; and
generate instructions to cause display of an electronic visualization interface comprising a dynamic electronic search configured to receive search criteria, wherein the electronic visualization interface is configured to identify, based on the indexed searching platform and the search criteria, any two or more sanitized log files from different hosts that satisfy the search criteria.

2. The computing system of claim 1, wherein the two or more sanitized log files are determined based on unique identifiers associated with each of the log files such that the two or more sanitized log files have the same unique identifier.

3. The computing system of claim 2, wherein each of the unique identifiers indicates software services of the respective log files.

4. The computing system of claim 2, wherein the same unique identifier is a particular error instance ID.

5. The computing system of claim 1, wherein each log file of the log files includes log data and metadata associated with a respective remote host of the plurality of remote hosts.

6. The computing system of claim 1, wherein the indexed sanitized log files comprise one or more of the following: log freshness, error identifiers, trace identifiers, service identifiers, originating service, originating host, originating log, service version, error priority level, and magnitude of the error.

7. The computing system of claim 1, wherein the electronic visualization interface further comprises a customizable viewing pane configured to receive modifications to the display of the log files or information associated with the log files.

8. The computing system of claim 1, wherein the electronic visualization interface further comprises a customizable viewing pane configured to receive customizations to the customizable viewing pane comprising adding columns, removing columns, adding viewable data, or removing viewable data.

9. The computing system of claim 1, wherein the plurality of remote hosts includes a first remote host and a second remote host, wherein the first remote host is associated with first configurable rules and the second remote host is associated with second configurable rules, and wherein the first configurable rules and the second configurable rules are different.

10. The computing system of claim 1, wherein the sensitive user data associated with each of each of the plurality of remote hosts originates on each respective remote host such that the sensitive user data is captured or created on the respective remote host.

11. The computing system of claim 1, wherein the sensitive user data is removed from the one or more log files by each of the plurality of remote hosts but that the sensitive user data otherwise remains stored on each of the plurality of remote hosts.

12. The computing system of claim 1, wherein the electronic visualization interface is further configured to include one or more visualizations based at least in part on the sanitized log files, wherein the one or more visualizations comprise metrics associated with a quantity of occurrences of one or more log entries in the sanitized log files.

13. The computing system of claim 1, wherein the one or more hardware computer processors are further configured to: generate a plurality of unique alphanumeric identifiers that correspond to one or more of the multiple software services running on each of the plurality of remote hosts, wherein the plurality of unique alphanumeric identifiers are generated based at least in part on the configurable rules, and wherein the identified any two or more sanitized log files are associated with the same unique identifier.

14. A method performed by at least one electronic device comprising one or more processors, the method comprising:
generating electronic instructions comprising logging specifications for generating sanitized log files that are based at least in part on one or more log files associated with events performed by each of multiple software services executed by each of a plurality of remote hosts;
transmitting, to each of the plurality of remote hosts by one or more networks, the electronic instructions, wherein the logging specifications include configurable rules for each of the plurality of remote hosts to automatically execute to determine data that is uploaded to a log pipeline so that the sanitized log files generated by each of the plurality of remote hosts include a subset of the data included in the one or more log files such that sensitive user data captured by each of the plurality of remote hosts is removed from the one or more log files by the plurality of remote hosts while generating the sanitized log files, and wherein the subset of the data included in the one or more log files is further generated to be in a uniform data format that is in compliance with the configurable rules;

electronically receiving, from each of the plurality of remote hosts by one or more networks, the sanitized log files;

indexing the sanitized log files into an indexed searching platform, wherein the indexing is based at least in part on the sanitized log files being in the uniform data format that is in compliance with the configurable rules; and generating instructions to cause display of an electronic visualization interface comprising a dynamic electronic search configured to receive search criteria, wherein the electronic visualization interface is configured to identify, based on the indexed searching platform and the search criteria, any two or more sanitized log files from different hosts that satisfy the search criteria.

15. The method of claim 14, wherein the two or more sanitized log files are determined based on unique identifiers associated with each of the log files such that the two or more sanitized log files have the same unique identifier.

16. The method of claim 15, wherein each of the unique identifiers indicates software services of the respective log files.

17. The method of claim 15, wherein the same unique identifier is a particular error instance ID.

18. A non-transitory computer-readable medium storing a set of instructions that are executable by one or more electronic devices, each having one or more processors, to cause the one or more electronic devices to perform a method, the method comprising:

generate electronic instructions comprising logging specifications for generating sanitized log files that are based at least in part on one or more log files associated with events performed by each of multiple software services executed by each of a plurality of remote hosts;

transmit, to each of the plurality of remote hosts by one or more networks, the electronic instructions, wherein the logging specifications include configurable rules for each of the plurality of remote hosts to automatically execute to determine data that is uploaded to a log pipeline so that the sanitized log files generated by each of the plurality of remote hosts include a subset of the data included in the one or more log files such that sensitive user data captured by each of the plurality of remote hosts is removed from the one or more log files by the plurality of remote hosts while generating the sanitized log files, and wherein the subset of the data included in the one or more log files is further generated to be in a uniform data format that is in compliance with the configurable rules;

electronically receive, from each of the plurality of remote hosts by one or more networks, the sanitized log files;

index the sanitized log files into an indexed searching platform, wherein the indexing is based at least in part on the sanitized log files being in the uniform data format that is in compliance with the configurable rules; and generate instructions to cause display of an electronic visualization interface comprising a dynamic electronic search configured to receive search criteria, wherein the electronic visualization interface is configured to identify, based on the indexed searching platform and the search criteria, any two or more sanitized log files from different hosts that satisfy the search criteria.

* * * * *

UNITED STATES PATENT AND TRADEMARK OFFICE
CERTIFICATE OF CORRECTION

| | |
|---|---|
| PATENT NO. | : 11,442,802 B2 |
| APPLICATION NO. | : 16/878928 |
| DATED | : September 13, 2022 |
| INVENTOR(S) | : Mahmoud Abdelsalam |

It is certified that error appears in the above-identified patent and that said Letters Patent is hereby corrected as shown below:

On the Title Page

Column 2, item [57], Line 8, delete "embodiments" and insert -- embodiments, --.

In the Specification

Column 7, Line 52, delete "eXtendible" and insert -- eXtensible --.

Column 10, Line 32, delete "no encrypted" and insert -- non-encrypted --.

Column 17, Line 33, delete "traceid" and insert -- traceId --.

Column 17, Line 62, delete "traceid" and insert -- traceId --.

Column 18, Line 27, delete "0.8.0" and insert -- 8.3.1 --.

Column 18, Line 27, delete "171310" and insert -- 16200 --.

Column 18, Line 38, delete "0.8.0" and insert -- 8.3.1 --.

Column 18, Line 46, delete "0.8.0" and insert -- 8.3.1 --.

Column 29, Line 41, delete "browser)," and insert -- browser, --.

In the Claims

Column 32, Line 43-45, Claim 13, after "hosts" delete ", wherein the plurality of unique alphanumeric identifiers are generated based at least in part on the configurable rules,".

Signed and Sealed this
Tenth Day of January, 2023

*Katherine Kelly Vidal*

Katherine Kelly Vidal
*Director of the United States Patent and Trademark Office*